US011103860B2

(12) United States Patent
Carpenter et al.

(10) Patent No.: US 11,103,860 B2
(45) Date of Patent: Aug. 31, 2021

(54) CATALYST SYSTEMS COMPRISING ACTIVATOR, POLYMERIZATION PROCESSES USING SAME, AND PRODUCTS MADE THEREFROM

(71) Applicant: ExxonMobil Chemical Patents Inc., Baytown, TX (US)

(72) Inventors: Alex E. Carpenter, Houston, TX (US); Crisita Carmen H. Atienza, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 101 days.

(21) Appl. No.: 16/289,962

(22) Filed: Mar. 1, 2019

(65) Prior Publication Data

US 2019/0275506 A1    Sep. 12, 2019

Related U.S. Application Data

(60) Provisional application No. 62/640,336, filed on Mar. 8, 2018.

(51) Int. Cl.

| | | |
|---|---|---|
| *B01J 31/00* | (2006.01) | |
| *B01J 31/02* | (2006.01) | |
| *B01J 31/40* | (2006.01) | |
| *C08F 4/659* | (2006.01) | |
| *C08F 210/16* | (2006.01) | |
| *C08F 2/06* | (2006.01) | |

(52) U.S. Cl.
CPC ....... *B01J 31/0237* (2013.01); *B01J 31/4015* (2013.01); *C08F 2/06* (2013.01); *C08F 4/65912* (2013.01); *C08F 210/16* (2013.01); *B01J 2231/12* (2013.01); *B01J 2531/48* (2013.01); *B01J 2531/845* (2013.01); *C08F 2500/02* (2013.01); *C08F 2500/04* (2013.01); *C08F 2500/08* (2013.01)

(58) Field of Classification Search
None
See application file for complete search history.

(56) References Cited

U.S. PATENT DOCUMENTS

| | | | |
|---|---|---|---|
| 3,527,828 A | 9/1970 | Mango | 260/677 |
| 6,476,164 B1 | 11/2002 | Rix | 526/128 |
| 8,658,556 B2 | 2/2014 | Stewart | 502/202 |
| 2005/0123778 A1 | 6/2005 | Pehlert et al. | 428/461 |
| 2014/0038486 A1 | 2/2014 | Crowther et al. | 442/327 |

FOREIGN PATENT DOCUMENTS

WO   2016/094861   6/2016

OTHER PUBLICATIONS

Metz et al., "Weakly Coordinating AL-, NB-, TA-, Y-, and LA-based Perfluoroaryloxymetalate Anions as Cocatalyst Components for Single-Site Olefin Polymerization," Organometallics, American Chemical Society, 2002, vol. 21, No. 18, pp. 3691-3702.
Sun et al., "Al-, NB-, and TA-Based Perfluoroaryloxide Anions as Cocatalysts or Metallocene-Mediated Ziergler-Natta Olefin Polymerization," Organometallics, American Chemical Society, 2000,vol. 19, No. 9, pp. 1625-1627.
Chen et al., "Cocatalysts for Metal-Catalyzed Olefin Polymerization: Activators, Activation Processes, and Structure-Activity Relationships," Chemical Review, American Chemical Society, 2000, vol. 100, pp. 1391-1434.
Frenz et al., "Structure of hydridotetrakis(trifluorophosphine)cobalt(I), CoH(PF3)4," Inorg. Chem., 1970, vol. 9, No. 11, pp. 2403-2408.
Kruck et al., "Synthesis of Tetrakis(trifluorophosphine)cobalt Hydride and Hexakis(trifluorophosphine)tungsten(0) [1]," Angew. Chem. Int. Ed., 1965, vol. 4, No. 2, pp. 148-149.
Kruck et al., "Synthesis of Tetrakistrifluorophosphinoiridium Hydride and the Proton Magnetic Resonance Spectra of the Hydrides HM(PF3)4 (M=Co, Rh, Ir)," Angew. Chem. Int. Ed., 1965, vol. 4, No. 10, pp. 870-871.
Kruck, "Trifluorophosphine Complexes of Transition Metals," Angew. Chem. Int. Ed., 1967, vol. 6, No. 1, pp. 53-67.
Brennessel et al., "Bis(1,2,3,4_n4_anthracene)cobaltate(1−)," Angew. Chem. Int. Ed., 2002, vol. 41, No. 7, pp. 1211-1215.
Brennessel, et al., "Naphthalene and Anthracene Cobaltates(1−): Useful Storable Sources of an Atomic Cobalt Anion," Inorg. Chem., 2012, vol. 51, No. 16, pp. 9076-9094.
Ellis, "Adventures with Substances Containing Metals in Negative Oxidation States," Inorg. Chem., 2006, vol. 45, No. 8, pp. 3167-3186.
Muetterties et al., "Derivative chemistry of HCo[P(OR)3]4. I. Basic dynamic stereochemical processes," J. Am. Chem. Soc., 1973, vol. 95, No. 16, pp. 5419-5420.
Muetterties et al., "Chemistry of the transition metal-hydrogen bond. II. HCo[P(OR)3]4," J. Am. Chem. Soc., 1974, vol. 96, No. 26, pp. 7920-7925.

(Continued)

Primary Examiner — Yun Qian

(57) ABSTRACT

This invention relates to a polymerization catalyst system comprising group 8 or 9 containing non-coordinating anion activator, a polymerization catalyst compound, optional support, and optional scavenger. Preferably, the activator comprises a compound represented by the formula: $H_s(L)_m M$ where M is a group 8 or 9 metal, s is 0 or 1, m 1, 2, 3, or 4, each L ligand is independently C≡O, $NR_3$, $PR_3$, where each R, independently is halogen, haloalkyl, or haloaryl) or optionally two or more L ligands may together form a multiply-valent ligand complex. Further, this invention relates to anon-coordinating anion activator represented by the formula: $[Z_d]^+[H_sL_mM]^{d-}$, where M, s, m, L, are as defined above, d is 1, 2, or 3 and Z is (L'-H) or a reducible Lewis acid; L' is a neutral Lewis base; H is hydrogen, and (L'-H) is a Bronsted acid. This invention also relates to a process for making a polymeric product comprising contacting a C2-C40 alpha-olefin feed with the polymerization catalyst system to obtain a polymerization reaction mixture; and obtaining a polymer product from the polymerization reaction mixture.

9 Claims, 5 Drawing Sheets

(56) References Cited

OTHER PUBLICATIONS

Garcia-Monforte et al., "Homoleptic Organocobalt(III) Compounds with Intermediate Spin," Inorg. Chem., 2014, vol. 53, No. 23, pp. 12384123-95.
Gill et al., "Tetrahalo Complexes of Dipositive Metals in the First Transition Series," Inorg. Synth., 1967, vol. 9, pp. 136-142.
Carpenter et al., "A Well-Defined Isocyano Analogue of HCo(CO)4. 1: Synthesis, Decomposition, and Catalytic 1,1-Hydrogenation of Isocyanides,"Organometallics, 2016, vol. 35, No. 14, pp. 2309-2318.
Carpenter et al., "A Well-Defined Isocyano Analogue of HCo(CO)4. 2: Relative Brønsted Acidity as a Function of Isocyanide Ligation," Organometallics, 2016, vol. 35, No. 14, pp. 2319-2326.
Severn et al., ""Bound but Not Gagged"Immobilizing Single-Site α-Olefin Polymerization Catalysts," Chem. Rev., 2005, vol. 105, No. 11, pp. 4073-4147.
Song et al., "Synthesis, Ion Aggregation, Alkyl Bonding Modes, and Dynamics of 14-Electron Metallocenium Ion Pairs [(SBI) MCH2SiMe3+···X-] (M=Zr, Hf): Inner-Sphere (X=MeB(C6F5)3) versus Outer-Sphere (X=B(C6F5)4) Structures and the Implications for "Continuous" or "Intermittent" Alkene Polymerization Mechanisms," Organometallics, 2005, vol. 24, No. 6, pp. 1315-1328.

CATALYST SYSTEMS COMPRISING ACTIVATOR, POLYMERIZATION PROCESSES USING SAME, AND PRODUCTS MADE THEREFROM

PRIORITY CLAIM

This application claims priority to and the benefit of U.S. Ser. No. 62/640,336 filed Mar. 8, 2018 and is incorporated herein by reference in its entirety.

FIELD

The present disclosure relates to transition-metal containing non-coordinating anion activators, polymerization catalyst systems comprising a catalyst precursor, such as a metallocene, half-metallocene or post-metallocene compounds or a combination thereof, and a transition-metal containing non-coordinating anion activator, as well as processes for making a polymer product using the catalyst system, and polymer products so made.

BACKGROUND

This section provides background information related to the present disclosure which is not necessarily prior art.

Polyolefins are widely used commercially because of their robust physical properties. For example, various types of polyethylenes, including high density, low density, and linear low density polyethylenes, are some of the most commercially useful. Polyolefins are typically prepared with a catalyst that polymerizes olefin monomers.

Low density polyethylene is generally prepared at high pressure using free radical initiators. Low density polyethylene typically has a density at about 0.916-0.930 g/cm$^3$. Typical low density polyethylene produced using free radical initiators is known in the industry as "LDPE." LDPE is also known as "branched" or "heterogeneously branched" polyethylene because of the relatively large number of long chain branches extending from the main polymer backbone. Polyethylene with a similar density that does not contain long chain branches is known as "linear low density polyethylene" ("LLDPE") and is typically produced with conventional Ziegler-Natta catalysts or with metallocene catalysts. The term "linear" means that the polyethylene has few, if any, long chain branches and typically has a g'vis value of 0.97 or above, such as 0.98 or above. Polyethylenes having still greater density are the high density polyethylenes ("HDPEs"), e.g., polyethylenes having densities greater than 0.940 g/cm$^3$ and are generally prepared with Ziegler-Natta or chrome catalysts. Very low density polyethylenes ("VLDPEs") can be produced by a number of different processes yielding polyethylenes typically having a density 0.890 to 0.915 g/cm$^3$.

Copolymers of polyolefins, such as polyethylene, have a comonomer, such as an alpha olefin (often butene, hexane, or octene), incorporated into the polyethylene backbone. These copolymers provide varying physical properties compared to polyethylene alone and are typically produced in a low pressure reactor, utilizing, for example, solution, slurry, or gas phase polymerization processes. Polymerization may take place in the presence of catalyst systems such as those employing a Ziegler-Natta catalyst, a chromium based catalyst, a metallocene catalyst, or a post-metallocene catalyst.

A copolymer composition has a composition distribution, which refers to the distribution of comonomer in the copolymer, typically along the copolymer backbone. When the amount of comonomer varies among the copolymer molecules, the composition is said to have a "broad" composition distribution. When the amount of comonomer per 1000 carbons is similar among the copolymer molecules of different chain lengths, the composition distribution is said to be "narrow."

The composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

A composition distribution of a copolymer composition is influenced by the identity of the catalyst used to form the polyolefins of the composition. Ziegler-Natta catalysts and chromium based catalysts produce compositions with broad composition distributions, whereas metallocene catalysts typically produce compositions with narrow composition distributions.

There exists a need for catalyst systems that provide polyolefin compositions having novel combinations of comonomer content fractions and molecular weight distributions.

Useful catalysts for olefin polymerization are often based on cyclopentadienyl (Cp) transition metal catalyst compounds having 1, 2 or 3 Cp rings bound to the transition metal (preferably metallocenes having 1 or 2 Cp rings) as catalyst precursors combined with activators, typically an alumoxane or with an activator containing a non-coordinating anion. A typical metallocene catalyst system includes metallocene catalyst, activator, and optional support. Supported catalyst systems are used in many polymerization processes, often in slurry or gas phase polymerization processes.

Catalysts for olefin polymerization are often based on substituted metallocenes as catalyst precursors, which are activated either with the help of an alumoxane, or with an activator containing a non-coordinating anion.

Useful catalysts for olefin polymerization also include metal complexes that do not have Cp moieties (post-metallocenes). These catalyst precursors typically contain heteroatoms, which can be neutral or anionic, that are coordinated to the metal center. The coordinating group can also be a neutral carbon (such as carbenes) or a carbanion. Post-metallocenes typically contain 3-4 coordinating groups which may or may not be bridged.

Many metallate complexes, ions and the corresponding hydrides are known, e.g., cobalt metallates and cobalt hydrides. For instance, the following references disclose various aspects of the chemistry of metallates and hydrides: Frenz, B. A., and Ibers, J. A., *Inorg. Chem.,* 9(1970), 2403-07; Kruck, T., Lang, W., and Engelmann, A., *Angew. Chem. Int. Ed.,* 4(1965), 148; Kruck, T., and Lang, W., *Angew. Chem. Int. Ed.,* 4(1965), 870; Kruck, T., *Angew. Chem. Int. Ed.,* 6(1967), 53-67; Brennessel, W. W., Young, V. G., Jr., and Ellis, J. E., *Angew. Chem. Int. Ed.,* 41(2002), 1211-15; Brennessel, W. W., and Ellis, J. E., *Inorg. Chem.,* 51(2012), 9076-94; Ellis, J. E., *Inorg. Chem.,* 45(2006), 3167-86; Muetterties, E. L., and Hirsekorn, F. J., *J. Am. Chem. Soc.,* 95(1973), 5419-20; Muetterties, E. L., and Hirsekorn, F. J., *J. Am. Chem. Soc.,* 96(1974), 7920-25; Garcia-Monforte, M. A., Ara, I., Martin, A., Menjon, A., Tomas, M., Alonso, P. J., Arauzo, A. B., Martinez, J. I., and Rillo. C., *Inorg. Chem.,* 53(2014), 12384-95; Gill, N. S., and Taylor, F. B., *Inorg. Synth.,* 9(1967), 136-42; Carpenter, A. E., Rheingold, A. L., and Figueroa, J. S., *Organometallics,*

35(2016), 2309-18; and Carpenter, A. E., Chan, C., Rheingold, A. L., and Figueroa, J. S., *Organometallics,* 35(2016), 2319-26.

Six-coordinate octahedral tantalum and niobium anions have been suggested as activators for olefin polymerization catalysis: Sun, Y., Metz, M. V., Stern, C. L., Marks, T. J. *Organometallics,* 19(2000), 1625-1627. Metz, V. M., Sun, Y., Stern, C. L., Marks, T. J. *Organometallics,* 21(2002), 3691-3702. However, these systems incorporate perfluoroaryl or perfluorophnoxy functionalities and represent a limited departure from borate-based non-coordinating anions. Activators or co-catalysts often to exhibit a profound influence on olefin polymerization behavior. The following references disclose details regarding the role of activators in olefin polymerization: Song, F., Lancaster, S. J., Cannon, R. D., Schormann, M., Humphrey, S. M., Zuccaccia, C., Macchioni A., Bochman, M., *Organometallics* 24(2005) 1315-1328. Chen, E. Y., Marks, T. J. *Chem. Rev.* 100(2000), 1391-1434. Severn, J. R., Chadwick, J. C., Duchateau, R., Friederichs, N., *Chem. Rev.* 105(2005) 4073-4147. For example, structural changes to the steric or electronic properties of activators in olefin polymerization can have a profound and unpredictable influence on the a variety of attributes of an olefin polymerization systems including but not limited to the productivity, activity, composition distribution, molecular weight performance, co-monomer incorporation performance and degree of branching. Accordingly, there is a use for new classes of activators for use with olefin polymerization catalyst complexes.

Further, there is an overall need in the art for new and improved catalyst systems for the polymerization of olefins, in order to achieve increased activity or enhanced polymer properties, to increase conversion or comonomer incorporation, or to alter comonomer distribution. There is also a need for supported catalyst systems and processes for the polymerization of olefins (such as ethylene) using such catalyst systems to provide ethylene polymers having unique properties. Further, there is a need to develop catalyst systems where the activator does not utilize conventional group 13 elements, such as boron or aluminum.

SUMMARY

This invention relates to a polymerization catalyst system comprising a transition metal containing non-coordinating anion activator, a polymerization catalyst compound, optional support, and optional scavenger. In such polymerization catalyst systems, the activator is represented by the formula: $H_s(L)_mM$ where M is a group 8 or 9 metal, s is 0 or 1, m is the number of L ligands, typically 1, 2, 3, or 4, each L ligand is independently C≡O, $NR_3$, $PR_3$ (where each R, independently is halogen, haloalkyl, or haloaryl) or optionally two or more L ligands may together form a multiply-valent ligand complex.

In some embodiments, the activator exhibits thermal stability by having a decomposition temperature above about 100° C., exhibits Bronsted acidity with a pKa less than about 35, and/or can exist in a liquid phase in an appropriate solvent. In useful embodiments, the activator affords polymers with increased molecular weight relative to conventional borate based activators.

This invention also relates to a non-coordinating anion activator composition represented by the formula: $[Z_d]^+$ $[H_sL_mM]^{d-}$, where M is a group 8 or 9 metal, s is 0 or 1, m is the number of L ligands, typically 1, 2, 3, or 4, each L ligand is independently C≡O, $NR_3$, $PR_3$ (where each R, independently is halogen, haloalkyl, or haloaryl) or optionally two or more L ligands may together form a multiply-valent ligand complex, d is 1, 2, or 3 and Z is (L'-H) or a reducible Lewis acid; L' is a neutral Lewis base; H is hydrogen, (L'-H) is a Bronsted acid.

This invention also relates to the reaction product of a polymerization catalyst and a non-coordinating anion activator composition represented by the formula: $[Z_d]^+$ $[H_sL_mM]^{d-}$, where M is a group 8 or 9 metal, s is 0 or 1, m is the number of L ligands, typically 1, 2, 3, or 4, each L ligand is independently C≡O, $NR_3$, $PR_3$ (where each R, independently is halogen, haloalkyl, or haloaryl) or optionally two or more L ligands may together form a multiply-valent ligand complex, d is 1, 2, or 3 and Z is (L'-H) or a reducible Lewis acid; L' is a neutral Lewis base; H is hydrogen, (L'-H) is a Bronsted acid.

Another aspect of the invention relates to a process for making a polymeric product. The process can comprise contacting a feed containing a C2 to C40 alpha-olefin with a polymerization catalyst system as described herein in a polymerization reactor under polymerization conditions to effect a polymerization reaction to obtain a polymerization reaction mixture, and obtaining a polymeric product from the polymerization reaction mixture.

In some embodiments, the feed can comprise a first content of ethylene (C2) being greater than 60 mol %. In some such embodiments, the feed can further comprise a remainder content of C3 to C40 alpha-olefins, relative to a total content of alpha-olefins in the feed, which remainder C3 to C40 content can constitute at least 75 mol % C6-C12 linear alpha-olefins, relative to a total amount of C3 to C40 alpha-olefins in the feed. Additionally or alternatively in these embodiments, the first content can be from 70 mol % to 100 mol % (e.g., from 70 mol % to 95 mol %) and the remainder content can be from 0 mol % to 30 mol % (e.g., from 5 mol % to 30 mol %).

In some embodiments, the polymerization can be a solution polymerization with a solvent or diluent comprising isobutane, butane, pentane, isopentane, hexanes, isohexane, heptane, octane, dodecane, cyclohexane, cycloheptane, methylcyclohexane, methylcycloheptane, a perfluorinated C4 to C10 alkane, chlorobenzene, benzene, toluene, mesitylene, xylene, or any combination thereof. In such embodiments, the activator is preferably at least partially soluble in the solvent at polymerization conditions.

In some embodiments, the polymerization reaction can result in the polymer product exhibiting, as measured by GPC, a polydispersity index (Mw/Mn) from 1.5 to 3.7, a number average molecular weight (Mn) of at least 700 g/mol, a weight average molecular weight of at least 2000 g/mol, or a combination thereof.

Aspects of this invention also relate to novel mixed catalyst systems, methods for polymerizing olefins comprising contacting such mixed catalyst systems including an activator as described herein with one or more monomers, and polymer compositions produced by the methods described herein.

Further areas of applicability will become apparent from the description provided herein. The description and specific examples in this summary are intended for purposes of illustration only and are not intended to limit the scope of the present disclosure.

DETAILED DESCRIPTION

Definitions

Figure 1:
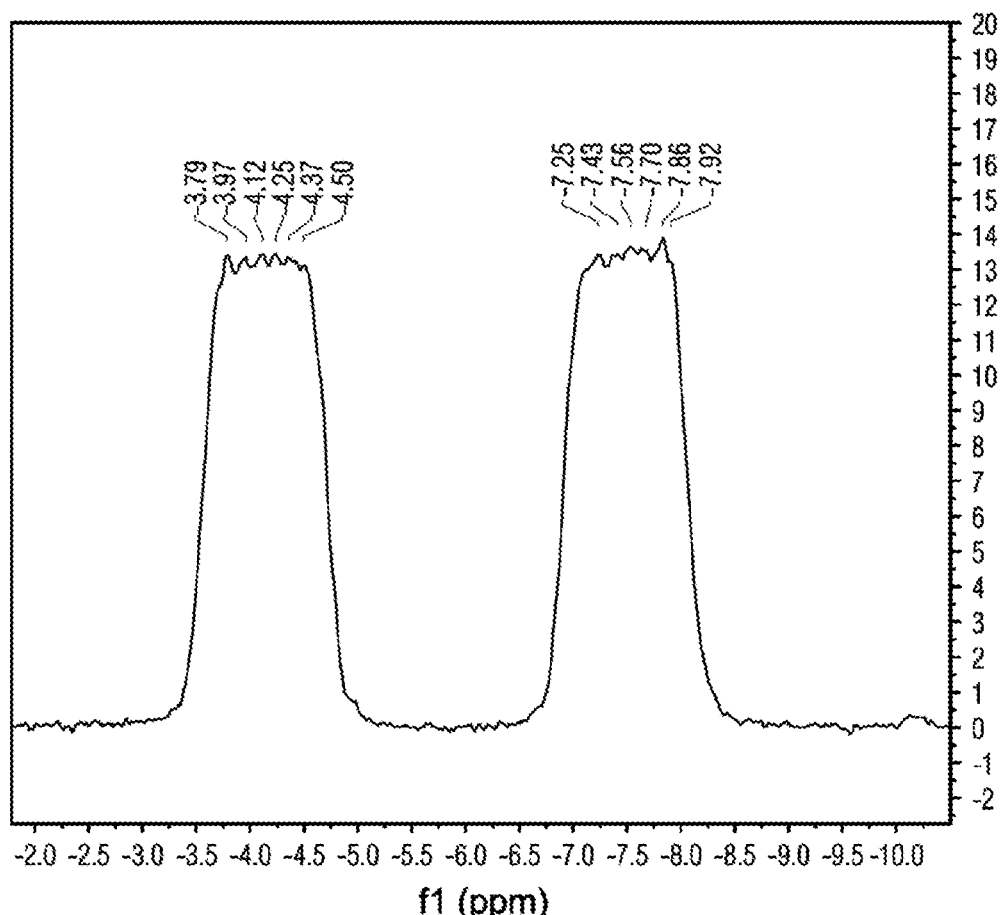
FIG. 1 shows a $^{19}F$ NMR spectrum of the activator of Example 2 in THF-d8.

All numerical values within the detailed description and the claims herein are modified by "about" or "approximately" the indicated value, and take into account experimental error and variations that would be expected by a person having ordinary skill in the art.

For the purposes of this invention and the claims thereto, the new numbering scheme for the Periodic Table Groups is used as described in CHEMICAL AND ENGINEERING NEWS, 63(5), pg. 27 (1985). Therefore, a "group 4 metal" is an element from group 4 of the Periodic Table, e.g. Hf, Ti, or Zr.

The term "alkyl" or "alkyl group" interchangeably refers to a saturated hydrocarbyl group consisting of carbon and hydrogen atoms. An alkyl group can be linear, branched linear, branched, or cyclic.

The term haloalkyl is defined to mean an alkyl group substituted with at least one halogen.

The term "branched linear" is defined to mean a branched group that is not dendritic (i.e., branch on branch) or crosslinked, typically a branched linear group is a linear group that has one or more branches.

The term "cycloalkyl" or "cycloalkyl group" interchangeably refers to a saturated hydrocarbyl group wherein the carbon atoms form one or more ring structures.

The term "alkenyl" or "alkenyl group" interchangeably refers to a linear unsaturated hydrocarbyl group comprising a C═C bond therein.

The term "cycloalkenyl" or "cycloalkenyl group" interchangeably refers to cyclic hydrocarbyl group comprising a C═C bond in the ring.

The term "aryl" or "aryl group" interchangeably refers to a hydrocarbyl group comprising an aromatic ring structure therein and the substituted variants thereof, including but not limited to, phenyl, 2-methyl-phenyl, xylyl, 4-bromo-xylyl, etc. Likewise "heteroaryl" means an aryl group where a ring carbon atom (or two or three ring carbon atoms) has been replaced with a heteroatom, such as N, O, and/or S (alternatively, in some embodiments, including Si). As used herein, the term "aromatic" also refers to pseudo-aromatic heterocycles which are heterocyclic substituents that have similar properties and structures (nearly planar) to aromatic heterocyclic ligands, but are not by definition aromatic.

The term haloaryl is defined to mean an aryl group substituted with at least one halogen.

As used herein, the terms "aralkyl" and "alkaryl" interchangeably refer to compounds or moieties having mixed aryl and alkyl character, and, depending upon the context, may also refer to wholly aryl and/or wholly alkyl compounds or moieties as well.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

Except with respect to the term "substituted hydrocarbyl," the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, where each R* is independently a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring. As examples, methyl cyclopentadiene (Cp) is a Cp group substituted with a methyl group, and ethyl alcohol is an ethyl group substituted with an —OH group. The term "substituted hydrocarbyl" means hydrocarbyl radicals in which at least one hydrogen atom of the hydrocarbyl radical has been substituted with at least one non-hydrogen group, such as another hydrocarbyl group (e.g., phenyl), which may impart a branch to the hydrocarbyl group, or substituted with a heteroatom or heteroatom-containing group, such as halogen (e.g., Br, Cl, F or I), or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, where each R* is independently a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring.

The terms "group," "radical," and "substituent" may be used interchangeably.

The terms "hydrocarbyl radical," "hydrocarbyl group," or "hydrocarbyl" can be used interchangeably are refers to a group consisting of hydrogen and carbon atoms only. A hydrocarbyl group can be saturated or unsaturated, linear or branched, cyclic or acyclic, aromatic or non-aromatic. Preferably a "hydrocarbyl" is a $C_1$-$C_{100}$ radical that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like.

In some embodiments, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous hydrocarbyl substituted cyclopropyls); pentyl includes n-pentyl, cyclopentyl, 1-methylbutyl, 2-methylbutyl, 3-methylbutyl, 1-ethylpropyl, and neopentyl (and analogous hydrocarbyl substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compound having hydrocarbyl substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Analogous to "hydrocarbyl," the terms "hydrosilylcarbyl radical," "hydrosilylcarbyl group," or "hydrosilylcarbyl" interchangeably refers to a group consisting of hydrogen, carbon, and silicon atoms only. A hydrosilylcarbyl group can be saturated or unsaturated, linear or branched, cyclic or acyclic, aromatic or non-aromatic, and with the silicon atom being within and/or pendant to the cyclic/aromatic rings.

The term "Cn" group or compound refers to a group or a compound comprising carbon atoms at total number thereof of n. Thus, a "Cm-Cn" group or compound refers to a group or compound comprising carbon atoms at a total number thereof in the range from m to n. Thus, a C1-C50 alkyl group refers to an alkyl group comprising carbon atoms at a total number thereof in the range from 1 to 50.

For purposes of this invention and claims thereto, the terms "alkoxy" and "alkoxide" mean an alkyl ether or aryl ether group/radical connected to an oxygen atom and can include those where the alkyl/aryl group is a C1 to C10 hydrocarbyl. The alkyl group may be straight chain, branched, or cyclic. The alkyl group may be saturated or unsaturated.

The term "olefin," alternatively termed "alkene," refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be linear, branched linear, branched, or cyclic.

The term "alpha-olefin" refer to an olefin having a terminal carbon-to-carbon double bond in the structure thereof $((R^1R^2)-C=CH_2$, where $R^1$ and $R^2$ can be independently hydrogen or any hydrocarbyl group; preferably $R^1$ is hydrogen and $R^2$ is an alkyl group). A "linear alpha-olefin" is an alpha-olefin defined in this paragraph wherein $R^1$ is hydrogen, and $R^2$ is hydrogen or a linear alkyl group. Non-limiting examples of α-olefins include ethylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

For purposes of this specification and the claims appended thereto, when a polymer or copolymer is referred to as comprising an olefin, including, but not limited to ethylene, propylene, and/or butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units.

A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Thus, an "olefin" is intended to embrace all structural isomeric forms of olefins, unless it is specified to mean a single isomer or the context clearly indicates otherwise. Accordingly, the definition of copolymer, as used herein, includes terpolymers and the like. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on. An oligomer is a polymer having a low molecular weight, such as an Mn of 21,000 g/mol or less (preferably 10,000 g/mol or less), and/or a low number of mer units, such as 100 mer units or less (preferably 75 mer units or less). As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol (g mol$^{-1}$).

Molecular weight of polymer materials and distribution thereof in the present disclosure can be measured by using gel permeation chromatography (GPC) equipped with a multiple-channel band filter based infrared detector ensemble IR5 (GPC-IR) with band region covering from about 2700 cm$^{-1}$ to about 3000 cm$^{-1}$ (representing saturated C—H stretching vibration). Reagent grade 1,2,4-trichlorobenzene (TCB) (from Sigma-Aldrich) comprising ~300 ppm antioxidant BHT can be used as the mobile phase at a nominal flow rate of ~1.0 mL/min and a nominal injection volume of ~200 μL. The whole system including transfer lines, columns, and detectors can be contained in an oven maintained at ~145° C. A given amount of sample can be weighed and sealed in a standard vial with ~10 μL flow marker (heptane) added thereto. After loading the vial in the auto-sampler, the oligomer or polymer may automatically be dissolved in the instrument with ~8 mL added TCB solvent at ~160° C. with continuous shaking. The sample solution concentration can be from ~0.2 to ~2.0 mg/ml, with lower concentrations used for higher molecular weight samples. The concentration, c, at each point in the chromatogram can be calculated from the baseline-subtracted IRS broadband signal, I, using the equation: c=αI, where α is the mass constant determined with polyethylene or polypropylene standards. The mass recovery can be calculated from the ratio of the integrated area of the concentration chromatography over elution volume and the injection mass which is equal to the pre-determined concentration multiplied by injection loop volume. The molecular weight can be determined by combining universal calibration relationship with Mark-Houwink equation in which the M-H parameters α and K are calculated in the published in literature (T. Sun, P. Brant, R. R. Chance, and W. W. Graessley, Macromolecules, Volume 34, Number 19, pp. 6812-6820, (2001)), except that for purposes of this invention and claims thereto, α=0.67 and K=0.000175 for polystyrene, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in $g/cm^3$, molecular weight is expressed in g/mole, and intrinsic viscosity (hence K in the Mark-Houwink equation) is expressed in dL/g unless otherwise noted. Number-average molecular weight (Mn) and weight-average molecular weight (Mw) of a polymer are obtained from the above process.

NMR spectroscopy provides key structural information about the synthesized polymers. Proton NMR ($^1$H-NMR) analysis may be an alternative method other than GPC to determine the molecular weight of oligomer or polymer materials. However, molecular weights of oligomer or polymer materials measured by $^1$H-NMR herein represent a number average molecular weight (Mn).

The terms "catalyst" and "catalyst compound" are defined to mean a compound capable of initiating catalysis and/or of facilitating a chemical reaction with little or no poisoning/consumption. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is combination of at least one catalyst compound, at least one activator, an optional co-activator, and an optional support material. A polymerization catalyst system is a catalyst system that can polymerize monomers to polymer. For the purposes of this invention and the claims thereto, when catalyst systems are described as comprising neutral stable forms of the components, it is well understood by one of ordinary skill in the art, that the ionic form of the component is the form that reacts with the monomers to produce polymers. An "anionic ligand" is a negatively charged ligand which donates one or more pairs of electrons to a metal ion. A "neutral donor ligand" is a neutrally charged ligand which donates one or more pairs of electrons to a metal ion.

A "metallocene" catalyst compound is a transition metal catalyst compound having one, two or three, typically one or two, substituted or unsubstituted cyclopentadienyl ligands bound to the transition metal, typically a metallocene catalyst is an organometallic compound containing at least one π-bound cyclopentadienyl moiety (or substituted cyclopentadienyl moiety). Useful metallocenes include those having 1, 2 or 3 substituted or unsubstituted cyclopentadienyl, indenyl or fluorenyl ligands.

Non-coordinating anion (NCA) is defined to mean an anion either that does not coordinate to the catalyst metal cation or that does coordinate to the metal cation, but only weakly. The term NCA is also defined to include multicomponent NCA-containing activators that contain an acidic cationic group and the non-coordinating anion. The term NCA is also defined to include neutral Lewis acids that can form non-coordinating or weakly coordinating anions by abstracting an anionic group from the catalyst. An NCA can coordinate weakly enough that a neutral Lewis base, such as an olefinically or acetylenically unsaturated monomer can displace it from the catalyst center.

A scavenger is a compound typically added to facilitate oligomerization or polymerization by scavenging impurities. Some scavengers may also act as activators and may be referred to as co-activators. A co-activator, that is not a scavenger, may be used in conjunction with an activator in order to form an active catalyst. In some embodiments, a co-activator can be pre-mixed with the catalyst compound to form an alkylated catalyst compound.

Unless otherwise indicated, "Catalyst productivity" is a measure of how many grams of polymer (P) are produced using a polymerization catalyst comprising W g of catalyst (cat), over a period of time of T hours; and may be expressed by the following formula: P/(T×W) and expressed in units of $gPgcat^{-1} hr^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported herein in terms of grams of polymer per millimole of catalyst per hour.

Melt index (MI), also referred to as I2 and reported in g/10 min, is determined according to ASTM D1238 (190° C., 2.16 kg load). High load melt index (HLMI), also referred to as I21 and also reported in g/10 min, is determined according to ASTM D1238 (190° C., 21.6 kg load). Melt index ratio (MIR) is defined herein as HLMI divided by MI, each individually as determined by ASTM D1238.

In the present disclosure, some polymerization catalyst compounds, such as metallocenes, may have one or more optical isomers. All such compounds identified herein by name or structure shall include all possible optical isomers thereof and mixtures of any such optical isomers. For example, metallocene catalyst $Me_2Si(Me_4Cp)(3-PrInd)ZrMe_2$ shall include the following two optical isomers and mixtures thereof, even if only one structure is given when it is described:

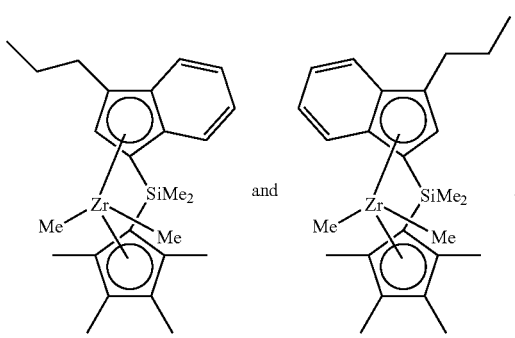

Unless specified otherwise, the term "substantially free of" with respect to a particular component means the concentration of that component in the relevant composition is no greater than 10 mol % (such as no greater than 5 mol %, no greater than 3 mol %, no greater than 1 mol %, or about 0%, within the bounds of the relevant measurement framework), based on the total quantity of the relevant composition.

The term "continuous" means a system that operates without interruption or cessation. For example a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid, as described in J. Vladimir Oliveira, C. Dariva, and J. C. Pinto, *Ind. Eng. Chem. Res.* 29, 2000, 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, less than 1 wt %, or approximately 0 wt %.

The following abbreviations may be used through this specification: Me is methyl, Ph is phenyl, Et is ethyl, Pr is propyl, iPr is isopropyl, nPr is normal propyl, Bu is butyl, iBu is isobutyl, sBu is sec-butyl, tBu is tertiary butyl, p-tBu is para-tertiary butyl, nBu is normal butyl, TMS is trimethylsilyl, TIBAL is triisobutylaluminum, TNOAL is triisobutyl n-octylaluminum, MAO is methylalumoxane, pMe is para-methyl, Ar* is 2,6-diisopropylaryl, Bz or Bn are interchangeably benzyl, THF is tetrahydrofuran, RT is room temperature (i.e., approximately 23° C.), tol is toluene, and Cp is a common abbreviation for cyclopentadiene or cyclopentadienyl.

I. Catalyst System

I.1 Polymerization Catalyst Compound(s)

The initial part to a catalyst system described herein is a polymerization catalyst compound. The polymerization catalyst compounds that may be used in the process of the present disclosure for making polymeric products may include any of a variety of catalysts having alpha-olefin polymerization activity. For example, useful polymerization catalyst compounds can comprise, consist essentially of, consist of, or be a pyridylamine catalyst, a pyridyl-diimine catalyst, a diamidoamine catalyst, a phosphinimine catalyst, a diimine catalyst, a diamide catalyst, a pyrrolidineimine catalyst, a phenoxydiamine catalyst, a diphenoxy amine catalyst, diphenoxy diamine catalyst, a catalyst with two phenoxy groups bridged by a moiety with two coordinating atoms, a phenoxyimine catalyst, a bisphenylphenol catalyst, a bridged metallocene catalyst, an unbridged metallocene catalyst, or a combination thereof, typically as a mixture or as a covalently linked multimetallic catalyst. Such catalysts can typically also be organometallic, therefore containing a metal component, M, such as a transition metal (e.g., a group 4 metal, typically hafnium or zirconium). Shown below is a list of exemplary structural motifs for a variety of classes of polymerization catalyst compounds, which are not meant to be limiting; in that list, "Ar" represents an aryl moiety (e.g., C1-C40, C1-C35, C1-C30, C1-C25, C1-C20, C1-C12, C1-C10, C1-C8, C1-C6, or C1-C4, containing any number of rings and pendant groups, at least one of which is aromatic), "M" represents a metal (though shown below as a group 4 metal), "H," "N," "O," and "P" represent their respective elements, "R" represents an optionally heteroatom-containing hydrocarbyl group (e.g., an optionally heteroatom-containing, substituted or unsubstituted, linear, branched, or cyclic C1-C40, C1-C35, C1-C30, C1-C25, C1-C20, C1-C12, C1-C10, C1-C8, C1-C6, or C1-C4, hydrocarbyl group), "X" represents a ligand linked to the metal M (e.g., comprising a halogen, a hydride, an amide, an alkoxide, a substituted alkoxide, a sulfide, a phosphide, a diene, an amine, a phosphine, an ether, or a C1-C40, C1-C35, C1-C30, C1-C25, C1-C20, C1-C16, C1-C12, C1-C10, C1-C8, C1-C6, or C1-C4 substituted or unsubstituted linear, branched, or cyclic hydrocarbyl group, or optionally the two (or more) X moieties may together form a fused ring or ring system).

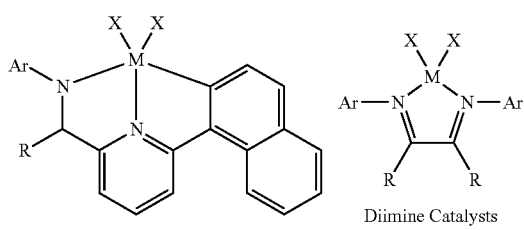

Pyridyl Amine Catalysts     Diimine Catalysts

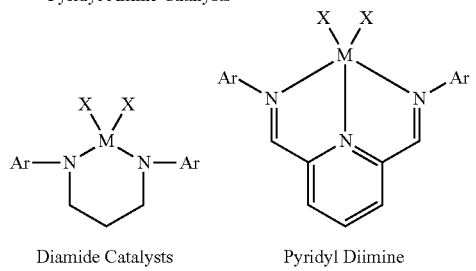

Diamide Catalysts     Pyridyl Diimine

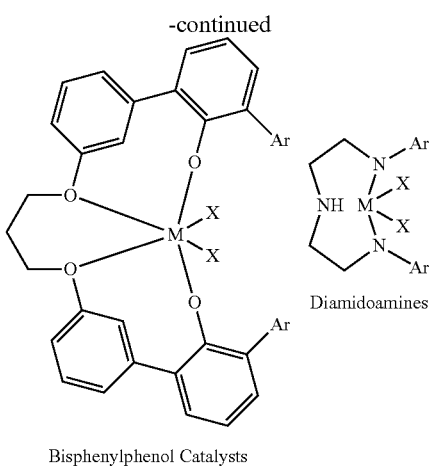

Bisphenylphenol Catalysts

Diamidoamines

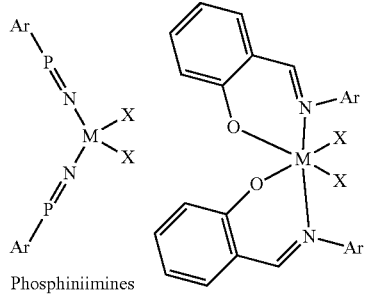

Phosphiniimines

Phenoxy Imines

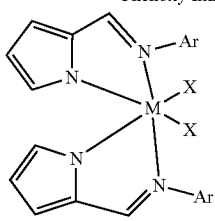

Pyrorolidine Imines

In some embodiments, preferred examples of C1-C40 substituted or unsubstituted linear, branched, or cyclic hydrocarbyl groups can include, but are not necessarily limited to: methyl, ethyl, n-propyl, isopropyl, n-butyl, 1-methylpropyl, 1-ethylethyl, n-pentyl, 1-methylpentyl, 1-ethylpropyl, 1-hexyl, 1-methylpentyl, 1-ethylbutyl, 1-propylpropyl, optionally substituted cyclohexyl, optionally substituted phenyl, optionally substituted benzyl, and the like, and any ethylenically unsaturated group that can be derived from them by eliminating one available hydrogen group from each of two adjacent carbon atoms therein.

In some embodiments, M may comprise, consist essentially of, or be Ti, Zr, and/or Hf. In a preferred embodiment, M may comprise, consist essentially of, or be Zr and/or Hf. In some embodiments, the coordination number of the metal M is 4, and thus the number of X ligands is 2.

In some embodiments, each X is independently a halogen or a substituted or unsubstituted linear, branched linear, or cyclic C1-C12 (e.g., C1-C10, C1-C8, C1-C6, or C1-C4) hydrocarbyl group, e.g., a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide.

In a particular embodiment, the polymerization catalyst compound may comprise, consist essentially of, or be a zirconium diphenoxy diamine catalyst. In a particular embodiment, the polymerization catalyst compound can comprise a zirconium metallocene compound, a hafnium metallocene compound, a titanium metallocene compound, or a combination thereof.

In some embodiments, the polymerization catalyst compound may comprise, consist essentially of, consist of, or be an unbridged metallocene compound having a structure represented by formula (F-MC1) below, or a bridged metallocene compound having a structure represented by formula (F-MC2) below:

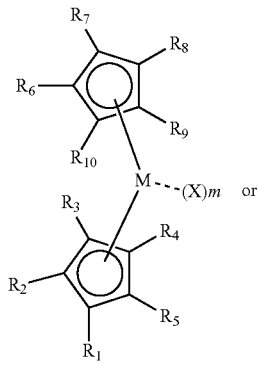

(F-MC1)

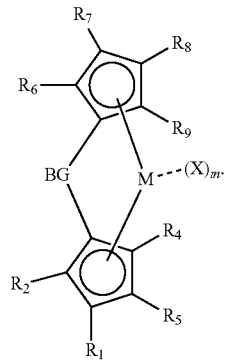

(F-MC2)

In formulas (F-MC1) and (F-MC2), each of $R^1$, $R^2$, $R^3$, $R^4$, and $R^5$ is a hydrogen or a substituted or unsubstituted linear, branched linear, or cyclic C1-C30 hydrocarbyl group, or optionally any two neighboring groups of $R^1$, $R^2$, $R^3$, $R^4$, and $R^5$, taken together with the carbon atoms in a first cyclopentadienyl ring to which they are directly connected, may collectively form one or more substituted or unsubstituted rings annelated to the first cyclopentadienyl ring; each of $R^6$, $R^7$, $R^8$, $R^9$, and $R^{10}$ is a hydrogen or a substituted or unsubstituted linear, branched linear, or cyclic C1-C30 hydrocarbyl group, or optionally any two neighboring groups of $R^6$, $R^7$, $R^8$, $R^9$, and $R^{10}$, taken together with the carbon atoms in a second cyclopentadienyl ring to which they are directly connected, may collectively form one or more substituted or unsubstituted rings annelated to the second cyclopentadienyl ring; the bridging group (BG) is represented by the formula: $—[BA(R^{11})_2]_n—$, wherein: n is 1, 2 or 3; each BA, the same or different at each occurrence, is independently carbon, silicon, or germanium; each $R^{11}$, the same or different at each occurrence, is each independently a C1-C8 substituted or unsubstituted linear, branched, or cyclic hydrocarbyl group, or a C1-C8 substituted or unsubstituted linear, branched, or cyclic substituted hydrocarbyl group; M is a transition metal having a coordination number of v (preferably v is 3, 4, 5, preferably 4), and m is an integer equal to v-2, preferably m is 1, 2, or 3; each X is independently a hydride, a halogen, an amide, an alkoxide, a substituted alkoxide, a sulfide, a phosphide, a diene, an amine, a phosphine, an ether, or a C1-C20 substituted or unsubstituted linear, branched, or cyclic hydrocarbyl group, or optionally two or more X moieties may together form a fused ring or ring system (comprising, e.g., one or more unsubstituted aromatic rings, one or more substituted aromatic rings, one or more unsubstituted heteroaromatic rings, one or more substituted heteroaromatic rings, one or more unsubstituted cycloalkyl rings, one or more substituted cycloalkyl rings, one or more unsubstituted cycloalkenyl rings, one or more substituted cycloalkenyl rings, one or more unsubstituted heterocycloalkyl rings, one or more substituted heterocycloalkyl rings, one or more unsubstituted heterocycloalkenyl rings, or one or more substituted heterocycloalkenyl rings).

Metallocene compounds generally can be synthesized by using typical chemical reagents (e.g., halides of hafnium, zirconium, titanium) and intermediates (such as ligands containing one or two substituted or unsubstituted Cp rings, substituted or unsubstituted annelated Cp ring such as indenyl rings, and the like) that are commercially available, and following typical reaction schemes exemplified in various synthesis descriptions, e.g., as described in the Experimental sections of U.S. Provisional Application Nos. 62/477,683, filed Mar. 28, 2017 and 62/477,706, filed Mar. 28, 2017, the contents of each of which are hereby incorporated by reference.

Useful metallocene compounds also include:
dimethyl rac-dimethylsilyl-bis-(5,6,7,8-tetrahydro-5,5,8,8-tetramethyl-2-methyl-1H-benz(f)indene)MX$_2$,
1,1'-bis(4-triethylsilylphenyl)methylene-(cyclopentadienyl) (3,8-di-tertiary-butyl-1-fluorenyl)MX$_2$,
meso-O(Me2SiInd)$_2$MX$_2$,
diphenylsilyl-bis(n-propylcyclopentadienyl)hafnium dimethyl, Ph$_2$Si(nPrCp)$_2$MX$_2$
dimethylsilyl bis(2-methyl, 4-phenyl-indenyl)MX$_2$,
bis(cyclopentadienyl)MX$_2$,
bis(n-butylcyclopentadienyl)MX$_2$,
(cyclopentadienyl)(n-butylcyclopentadienyl)MX$_2$,
bis(pentamethylcyclopentadienyl)MX$_2$,
(cyclopentadienyl)(pentamethylcyclopentadienyl)MX$_2$,
bis(1-methyl-3-n-butylcyclopentadienyl)MX$_2$,
(cyclopentadienyl)(indenyl)MX$_2$,
(cyclopentadienyl)(fluoreneyl)MX$_2$,
bis(1-methyl-3-n-butylcyclopentadienyl)MX$_2$,
bis(indenyl)MX$_2$,
bis(2-methyl, 4-phenyl-indenyl)MX$_2$,
bis(tetrahydro-1-indenyl)MX$_2$,
(i-propyl cyclopentadienyl)(pentamethyl cyclopentadienyl) MX$_2$, and
(n-propyl cyclopentadienyl)(pentamethyl cyclopentadienyl) MX$_2$,
dimethylsilylbis(indenyl)MX$_2$,
dimethylsilylbis(indenyl)MX$_2$,
dimethylsilylbis(indenyl)MX$_2$,
dimethylsilylbis(tetrahydroindenyl)MX$_2$,
dimethylsilyl bis(2-methylindenyl)MX$_2$,
dimethylsilyl bis(2-methylfluorenyl)MX$_2$,
dimethylsilyl bis(2-methyl-5,7-propylindenyl)MX$_2$,
dimethylsilyl bis(2-methyl-4-phenylindenyl)MX$_2$,
dimethylsilyl bis(2-ethyl-5-phenylindenyl)MX$_2$,
dimethylsilyl bis(2-methyl-5-biphenyl indenyl)MX$_2$,
dimethylsilylene bis(2-methyl-4-carbazolylindenyl)MX$_2$,
dimethylsilylene bis(2-methyl-4-carbazolylindenyl)MX$_2$,
dimethyl rac-dimethylsilyl-bis-(5,6,7,8-tetrahydro-5,5,8,8-tetramethyl-2-methyl-1H-benz(f)indene)MX$_2$,
Ph$_2$C(Cp)(Flu)MX$_2$,
dimethylsilyl bis(2-methyl indenyl)MX$_2$,
dimethylsilyl bis(2-methyl-5-phenyl indenyl)MX$_2$,
bis(methyl,n-butyl-cyclopentadinyl)MX$_2$,
Me$_2$Si bis(2-Me,3-Pr-indenyl)MX$_2$,
where M is Zr or Hf, and X is Me, Et, Pr, Bu, Ph, Bz, Cl, Br, or I.

Useful metallocene compounds include:
(Et$_3$Si)$_2$C(Cp)(3,8-di-t-Bu-Flu)HfMe$_2$,
bis(cyclopentadienyl)zirconium dichloride,
bis(n-butylcyclopentadienyl)zirconium dichloride,
diphenylsilyl-bis(n-propylcyclopentadienyl)hafnium dimethyl, Ph$_2$Si(nPrCp)$_2$HfMe$_2$, meso-O(Me2SiInd)$_2$ZrCl$_2$,
dimethyl rac-dimethylsilyl-bis-(5,6,7,8-tetrahydro-5,5,8,8-tetramethyl-2-methyl-1H-benz(f)indene)hafnium dimethyl;
dimethylsilylbis(indenyl)hafnium dimethyl,
dimethylsilylbis(indenyl)hafnium dichloride,
dimethylsilylbis(indenyl)hafnium dimethyl,
dimethylsilylbis(tetrahydroindenyl)zirconium dichloride,
dimethylsilyl bis(2-methylindenyl) zirconium dichloride,
dimethylsilyl bis(2-methylfluorenyl) zirconium dichloride,
dimethylsilyl bis(2-methyl-5,7-propylindenyl) zirconium dichloride,
dimethylsilyl bis(2-methyl-4-phenylindenyl) zirconium dichloride,
dimethylsilyl bis(2-ethyl-5-phenylindenyl) zirconium dichloride,
dimethylsilyl bis(2-methyl-5-biphenyl indenyl) zirconium dichloride,
dimethylsilylene bis(2-methyl-4-carbazolylindenyl) zirconium dimethyl,
dimethylsilylene bis(2-methyl-4-carbazolylindenyl) zirconium dichloride,
dimethyl rac-dimethylsilyl-bis-(5,6,7,8-tetrahydro-5,5,8,8-tetramethyl-2-methyl-1H-benz(f)indene)hafnium dimethyl,
Ph$_2$C(Cp)(Flu)HfMe$_2$,
dimethylsilyl bis(2-methyl indenyl) zirconium dimethyl,
dimethylsilyl bis(2-methyl-5-phenyl indenyl) zirconium dichloride,
bis(methyl,n-butyl-cyclopentadinyl) zirconium dichloride, and
1264 is racMe$_2$Si bis(2-Me,3-Pr-indenyl)HfMe$_2$.

In a preferred embodiment of the invention, the polymerization catalyst is a pyridyldiamido or quinolinyldiamido complex represented by the Formula I or II:

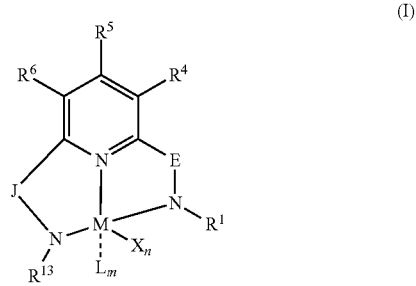

(I)

17
-continued

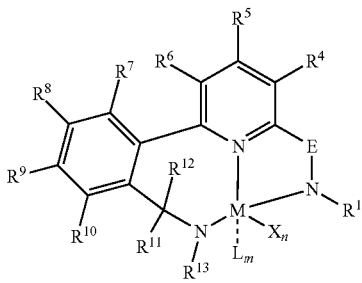

(II)

wherein:
M is a Group 3, 4, 5, 6, 7, 8, 9, or 10 metal (preferably M is Zr or Hf);
E is chosen from $C(R^2)$ or $C(R^3)(R^{3'})$;
X is an anionic leaving group (preferably X is methyl, chloride, or dialkylamido);
L is a neutral Lewis base (preferably L is ether, amine, phosphine, or thioether);
$R^1$ and $R^{13}$ are independently selected from the group consisting of hydrocarbyls, substituted hydrocarbyls, and silyl groups (preferably $R^1$ & $R^{13}$ are aryl groups, preferably $R^1$ is 2,6-disubstituted aryl, preferably $R^1$ is 2,6-diisopropylphenyl, preferably $R^{13}$ is 2-substituted aryl, preferably $R^{13}$ is phenyl, preferably $R^1$ is 2,6-disubstituted aryl group and $R^{13}$ is an aryl group lacking substitution in the 2 and 6 positions);
$R^2$ is a group containing 1-10 carbon atoms that is optionally joined with $R^4$ to form an aromatic ring (preferably $R^2$ & $R^4$ are joined, preferably with the joined $R^2R^4$ group being CHCHCH); $R^3$, $R^{3'}$, $R^4$, $R^5$, $R^6$, $R^7$, $R^8$, $R^9$, $R^{10}$, $R^{11}$, and $R^{12}$ are each independently selected from the group consisting of hydrogen, hydrocarbyls, alkoxy, silyl, amino, aryloxy, substituted hydrocarbyls, halogen, and phosphino (preferably $R^3$ & $R^{3'}$ are hydrogen);
J is a divalent group that forms a three-atom-length bridge between the pyridine ring and the amido nitrogen (preferably J is selected from the following structures);

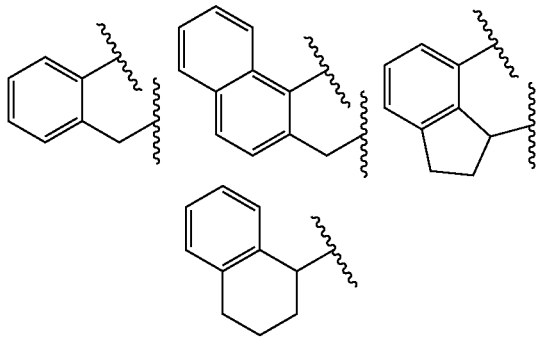

n is 1 or 2;
m is 0, 1, or 2;
two X groups may be joined together to form a dianionic group;
two L groups may be joined together to form a bidentate Lewis base;
an X group may be joined to an L group to form a monoanionic bidentate group; and
adjacent groups from the following $R^3$, $R^{3'}$, $R^4$, $R^5$, $R^6$, $R^7$, $R^8$, $R^9$, $R^{10}$, $R^{11}$, and $R^{12}$ may be joined to form a ring

18

(preferably $R^7$ & $R^8$ are joined to form an aromatic ring, preferably $R^7$ & $R^8$ are joined with the joined $R^7R^8$ group being CHCHCHCH, preferably $R^{10}$ & $R^{11}$ are joined to form a five- or six-membered ring, preferably $R^{10}$ & $R^{11}$ are joined with the joined $R^{10}R^{11}$ group being $CH_2CH_2$ or $CH_2CH_2CH_2$).

In a preferred embodiment, $R^4$ and E form a substituted or unsubstituted six-membered aromatic ring.

In yet further embodiments, useful catalyst compounds include those represented by the formula (6):

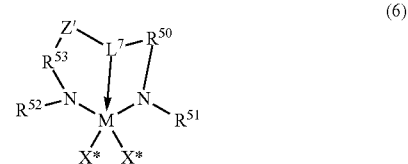

(6)

wherein (1) M is a group 4 metal, preferably hafnium; (2) N is nitrogen; (3) $L^7$ is a group that links $R^{50}$ to Z' by a three atom bridge with the central of the three atoms being a group 15 or 16 element that preferably forms a dative bond to M, and is a $C_5$-$C_{20}$ heteroaryl group containing a Lewis base functionality, especially a divalent pyridinyl, substituted pyridinyl, quinolinyl, or substituted quinolinyl group; (4) Z' is a divalent linker group, $(R^{56})_pC$—$C(R^{57})_q$, where $R^{56}$ and $R^{57}$ are independently selected from the group consisting of hydrogen, hydrocarbyls, substituted hydrocarbyls, and wherein adjacent $R^{56}$ and $R^{57}$ groups may be joined to form an aromatic or saturated, substituted or unsubstituted hydrocarbyl ring, wherein the ring has 5, 6, 7, or 8 ring carbon atoms and where the substituents on the ring can join to form additional rings, and p is 1 or 2 and q is 1 or 2; (5) $R^{50}$ and $R^{53}$ are each, independently, $ER^{54}R^{55}$ with E being carbon, silicon or germanium, and each $R^{54}$ and $R^{55}$ being independently selected from the group consisting of hydrogen, hydrocarbyls, substituted hydrocarbyls, alkoxy, silyl, amino, aryloxy, halogen and phosphino, and $R^{54}$ and $R^{55}$ may be joined to form a saturated heterocyclic ring, or a saturated substituted heterocyclic ring where substitutions on the ring can join to form additional rings; (6) $R^{51}$ and $R^{52}$ are independently selected from the group consisting of hydrocarbyls, substituted hydrocarbyls, silylcarbyls and substituted silylcarbyl groups; and (7) each X* is independently a univalent anionic ligand, or two X*s are joined and bound to the metal atom to form a metallocycle ring, or two X*s are joined to form a chelating ligand, a diene ligand, or an alkylidene ligand.

In yet further embodiments, useful catalyst compounds include pyridyl diamide metal complexes represented by the following Formula (6a):

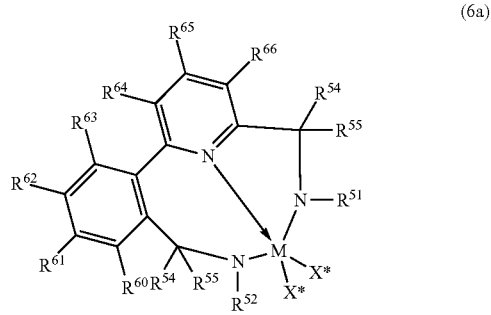

(6a)

wherein M, X*, N, $R^{51}$, $R^{52}$, $R^{54}$ and $R^{55}$ are as previously defined as in formula (6); $R^{60}$, $R^{61}$, $R^{62}$, $R^{63}$, $R^{64}$, $R^{65}$, $R^{66}$ are independently selected from the group consisting of hydrogen, hydrocarbyls, substituted hydrocarbyls, alkoxy, aryloxy, halogen, amino, and silyl, and wherein any one or more adjacent $R^{60}$-$R^{66}$ may be joined to form a substituted or unsubstituted hydrocarbyl or heterocyclic ring, wherein the ring has 5, 6, 7, or 8 ring atoms and where substitutions on the ring can join to form additional rings.

In an embodiment of the invention, $R^{60}$ to $R^{66}$ are hydrogen.

In an embodiment of the invention, $R^{62}$ is joined with $R^{63}$ to form a phenyl ring fused to the existing phenyl ring (e.g., a naphthyl group), and $R^{60}$, $R^{61}$, $R^{64}$, $R^{65}$, and $R^{66}$ are independently hydrogen or an alkyl group, preferably hydrogen.

In an embodiment of the invention, each $R^{54}$ and $R^{55}$ are independently hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred, but not limiting, aryl groups for $R^{54}$ or $R^{55}$ include phenyl, 2-methylphenyl, 2-ethylphenyl, 2-isopropylphenyl, and naphthyl.

In an embodiment of the invention, $R^{52}$ and $R^{51}$ are independently aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like.

In yet further embodiments, useful catalyst compounds include pyridyl diamide metal complexes, such as those represented by the following Formula (6b):

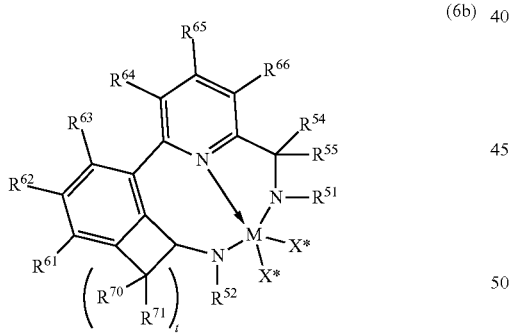

(6b)

wherein M, X*, N, $R^{51}$, $R^{52}$, $R^{54}$, $R^{55}$, $R^{61}$-$R^{66}$ are as previously defined as in formulae (6) and (6a); each $R^{70}$-$R^{71}$ are independently selected from the group consisting of hydrogen, hydrocarbyls, substituted hydrocarbyls, alkoxy, aryloxy, halogen, amino, and silyl, and wherein any one or more adjacent $R^{70}$-$R^{71}$ may be joined to form a substituted or unsubstituted hydrocarbyl or heterocyclic ring, wherein the ring has 5, 6, 7, or 8 ring atoms and where substitutions on the ring can join to form additional rings, and t is 2 or 3 (corresponding to cyclopentyl and cyclohexyl rings, respectively).

In an embodiment of the invention, $R^{61}$-$R^{66}$ are hydrogen.

In an embodiment of the invention, each $R^{70}$ and $R^{71}$ are independently hydrogen, and t is 2 or 3, preferably 2.

In an embodiment of the invention, each $R^{54}$ and $R^{55}$ are independently hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred, but not limiting, aryl groups include phenyl and 2-methylphenyl, 2-ethylphenyl, 2-isopropylphenyl and naphthyl.

In an embodiment of the invention, $R^{52}$ and $R^{51}$ are independently aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like.

In an embodiment of the invention, $R^{54}$, $R^{55}$, $R^{61}$-$R^{66}$, each $R^{70}$-$R^{71}$ are hydrogen, $R^{52}$ is phenyl, $R^{51}$ is 2,6-diisopropylphenyl and t is 2.

Non-limiting examples of pyridyl diamide catalysts that are useful herein are illustrated below, wherein X is methyl, benzyl, or chloro:

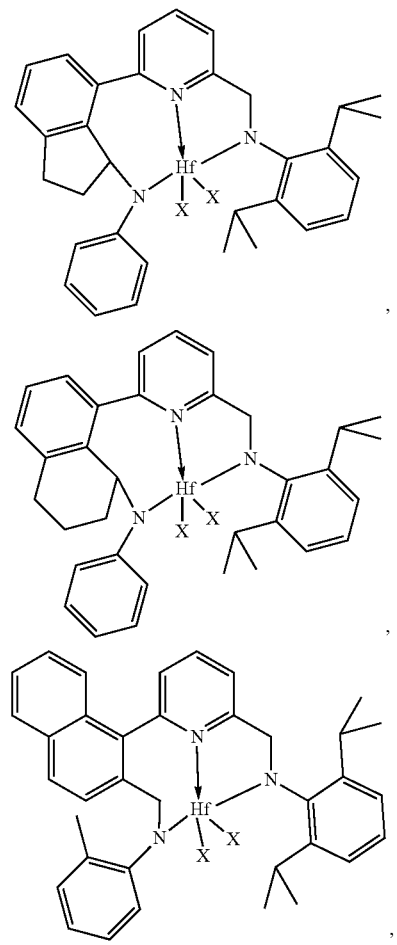

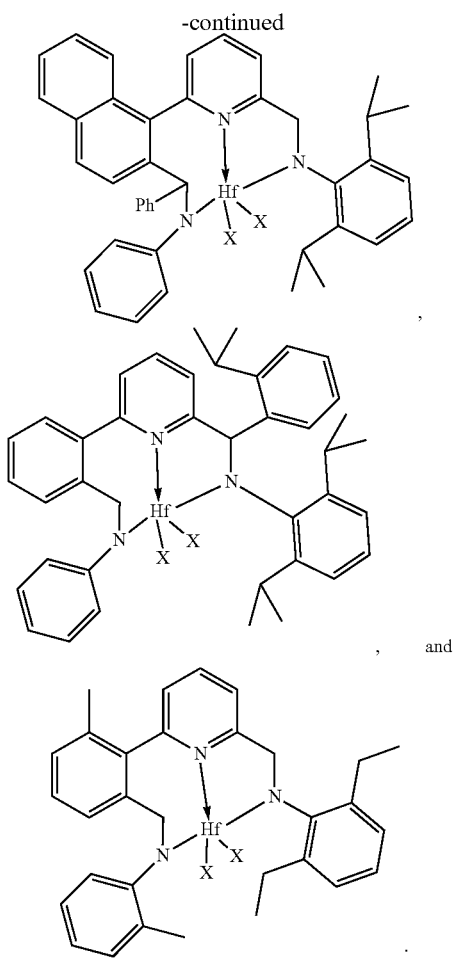

, and

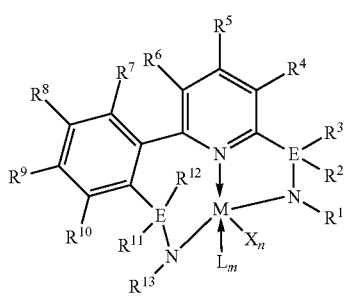

.

Additional pyridyl diamide transition metal complexes useful herein are described in US 2014/0316089; WO 2012/134614; WO 2012/134615; WO 2012/134613; US 2012/0071616; US 2011/0301310; and US 2010/0022726 and are incorporated by reference.

Transition metal complexes (also referred to as catalyst complexes or pre-catalyst complexes) useful herein include pyridyldiamido transition metal complexes represented by the Formula (A):

(A)

wherein:

M is a Group 3, 4, 5, 6, 7, 8, 9, 10, 11, or 12 metal;

E is selected from carbon, silicon, or germanium, preferably carbon;

X is an anionic leaving group, preferably alkyl, aryl, hydride, alkylsilane, fluoride, chloride, bromide, iodide, triflate, carboxylate, alkylsulfonate;

L is a neutral Lewis base, preferably ether, amine, thioether;

$R^1$ and $R^{13}$ are each independently selected from the group consisting of hydrocarbyls, substituted hydrocarbyls, and silyl groups, preferably aryl;

$R^2$, $R^3$, $R^4$, $R^5$, $R^6$, $R^7$, $R^8$, $R^9$, $R^{10}$, $R^{11}$, and $R^{12}$ are each independently selected from the group consisting of hydrogen, hydrocarbyls, alkoxy, silyl, amino, aryloxy, substituted hydrocarbyls, halogen, and phosphino;

n is 1 or 2;

m is 0, 1, or 2;

two X groups are optionally joined together to form a dianionic group;

two L groups are optionally joined together to form a bidentate Lewis base;

an X group may be joined to an L group to form a monoanionic bidentate group;

$R^7$ and $R^8$ are optionally joined to form a ring, preferably an aromatic ring, a six-membered aromatic ring with the joined $R^7$ and $R^8$ group being —CH=CHCH=CH—; and $R^{10}$ and $R^{11}$ are optionally joined to form a ring, preferably a five-membered ring with the joined $R^{10}$ and $R^{11}$ group being —CH$_2$CH$_2$—, a six-membered ring with the joined $R^{10}$ and $R^{11}$ group being —CH$_2$CH$_2$CH$_2$—.

In a preferred embodiment, $R^4$, $R^5$, and $R^6$ are independently selected from the group consisting of hydrogen, hydrocarbyls, substituted hydrocarbyls, alkoxy, aryloxy, halogen, amino, and silyl, and wherein adjacent R groups ($R^4$ and $R^5$ and/or $R^5$ and $R^6$) may be joined to form a substituted or unsubstituted hydrocarbyl or heterocyclic ring, where the ring has 5, 6, 7, or 8 ring atoms and where substitutions on the ring can join to form additional rings.

In another preferred embodiment, $R^7$, $R^8$, $R^9$, and $R^{10}$ are independently selected from the group consisting of hydrogen, hydrocarbyls, substituted hydrocarbyls, alkoxy, halogen, amino, and silyl, and wherein adjacent R groups ($R^7$ and $R^8$ and/or $R^9$ and $R^{10}$) may be joined to form a saturated, substituted or unsubstituted hydrocarbyl or heterocyclic ring, where the ring has 5, 6, 7, or 8 ring carbon atoms and where substitutions on the ring can join to form additional rings.

In still another preferred embodiment, n+m is not greater than 4.

In yet another preferred embodiment, $R^2$ and $R^3$ are each, independently, selected from the group consisting of hydrogen, hydrocarbyls, and substituted hydrocarbyls, alkoxy, silyl, amino, aryloxy, halogen, and phosphino, $R^2$ and $R^3$ may be joined to form a saturated, substituted or unsubstituted hydrocarbyl ring, where the ring has 4, 5, 6, or 7 ring carbon atoms and where substitutions on the ring can join to form additional rings, or $R^2$ and $R^3$ may be joined to form a saturated heterocyclic ring, or a saturated substituted heterocyclic ring where substitutions on the ring can join to form additional rings.

In still yet another preferred embodiment, $R^{11}$ and $R^{12}$ are each, independently, selected from the group consisting of hydrogen, hydrocarbyls, and substituted hydrocarbyls, alkoxy, silyl, amino, aryloxy, halogen, and phosphino, $R^{11}$ and $R^{12}$ may be joined to form a saturated, substituted or unsubstituted hydrocarbyl ring, where the ring has 4, 5, 6, or 7 ring carbon atoms and where substitutions on the ring can join to form additional rings, or $R^{11}$ and $R^{12}$ may be joined to form a saturated heterocyclic ring, or a saturated substituted heterocyclic ring where substitutions on the ring can join to form additional rings.

In a preferred embodiment, $R^1$ and $R^{13}$ may be independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

Preferred $R^3$-E-$R^2$ groups and preferred $R^{12}$-E-$R^{11}$ groups include $CH_2$, $CMe_2$, $SiMe_2$, $SiEt_2$, $SiPr_2$, $SiBu_2$, $SiPh_2$, $Si(aryl)_2$, $Si(alkyl)_2$, CH(aryl), CH(Ph), CH(alkyl), and CH(2-isopropylphenyl), where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl, preferably phenyl, 2-isopropylphenyl, or 2-tertbutylphenyl).

In a preferred embodiment, each X may be independently selected from halide, alkyl, aryl, alkoxy, amido, hydrido, phenoxy, hydroxy, silyl, allyl, alkenyl, triflate, alkylsulfonate, arylsulfonate, and alkynyl. The selection of the leaving groups depends on the synthesis route adopted for arriving at the complex and may be changed by additional reactions to suit the later activation method in polymerization. For example, alkyl is preferred when using non-coordinating anions such as N,N-dimethylanilinium tetrakis (pentafluorophenyl)-borate or tris(pentafluorophenyl) borane. In another embodiment, two L groups may be linked to form a dianionic leaving group, for example, oxalate.

In another embodiment of the invention, each L is independently selected from the group consisting of ethers, thio-ethers, amines, nitriles, imines, pyridines, and phosphines, preferably ethers.

In any embodiment of the invention described herein, M is preferably a Group 4 metal, preferably Zr or Hf.

In any embodiment of the invention described herein, each E is preferably carbon.

In any embodiment of the invention described herein, the transition metal complex is represented by the formula:

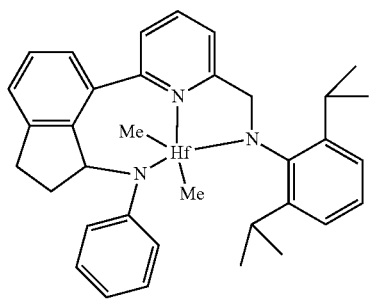

In particularly preferred embodiments, the catalyst compound is a quinolinyldiamido complex represented by the Formula I or II:

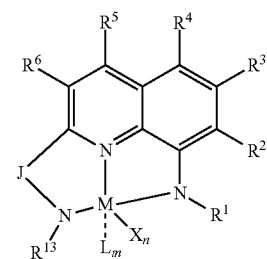

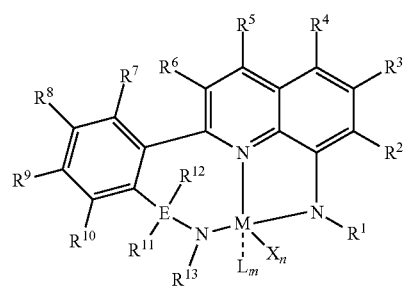

wherein:
M is a Group 3, 4, 5, 6, 7, 8, 9, or 10 metal (preferably M is Zr or Hf);
E is C, Si or Ge;
X is an anionic leaving group (preferably X is methyl, chloride, or dialkylamido);
L is a neutral Lewis base (preferably L is ether, amine, phosphine, or thioether);
$R^1$ and $R^{13}$ are independently selected from the group consisting of hydrocarbyls, substituted hydrocarbyls, and silyl groups (preferably $R^1$ & $R^{13}$ are aryl groups, preferably $R^1$ is 2,6-disubstituted aryl, preferably $R^1$ is 2,6-diisopropylphenyl, preferably $R^{13}$ is 2-substituted aryl, preferably $R^{13}$ is phenyl, preferably $R^1$ is 2,6-disubstituted aryl group and $R^{13}$ is an aryl group lacking substitution in the 2 and 6 positions);
$R^2$, $R^3$, $R^4$, $R^5$, $R^6$, $R^7$, $R^8$, $R^9$, $R^{10}$, $R^{11}$, and $R^{12}$ are each independently selected from the group consisting of hydrogen, hydrocarbyls, alkoxy, silyl, amino, aryloxy, substituted hydrocarbyls, halogen, and phosphino;
J is a divalent group that forms a three-atom-length bridge between the pyridine ring and the amido nitrogen (preferably J is selected from the following structures);

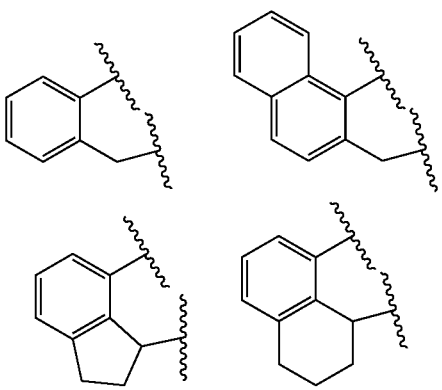

n is 1 or 2;
m is 0, 1, or 2; and
two X groups may be joined together to form a dianionic group;

two L groups may be joined together to form a bidentate Lewis base;

an X group may be joined to an L group to form a monoanionic bidentate group;

adjacent groups from the following $R^2$, $R^3$, $R^4$, $R^5$, $R^6$, $R^7$, $R^8$, $R^9$, $R^{10}$, $R^{11}$, and $R^{12}$ may be joined to form a ring (preferably $R^7$ & $R^8$ are joined to form an aromatic ring, preferably $R^7$ & $R^8$ are joined with the joined $R^7R^8$ group being CHCHCHCH, preferably $R^{10}$ & $R^{11}$ are joined to form a five- or six-membered ring, preferably $R^{10}$ & $R^{11}$ are joined, with the joined $R^{10}R^{11}$ group being $CH_2CH_2$ or $CH_2CH_2CH_2$).

In yet further embodiments, useful catalyst compounds include quinolinyldiamido metal complexes, such as those represented by the following Formula (6b):

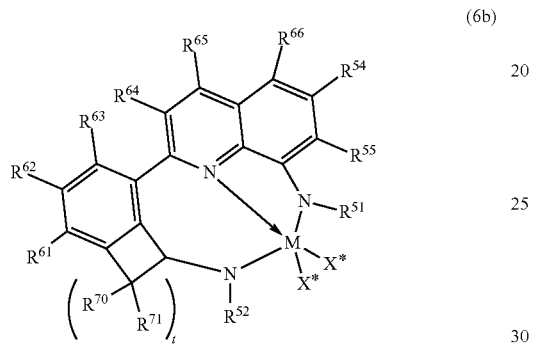

(6b)

wherein

M is a group 4 metal, preferably hafnium; (2) N is nitrogen; $R^{54}$ and $R^{55}$, being independently selected from the group consisting of hydrogen, hydrocarbyls, substituted hydrocarbyls, alkoxy, silyl, amino, aryloxy, halogen and phosphino, and $R^{54}$ and $R^{55}$ may be joined to form a saturated heterocyclic ring, or a saturated substituted heterocyclic ring where substitutions on the ring can join to form additional rings; $R^{51}$ and $R^{52}$ are independently selected from the group consisting of hydrocarbyls, substituted hydrocarbyls, silylcarbyls and substituted silylcarbyl groups; each X* is independently a univalent anionic ligand, or two X*s are joined and bound to the metal atom to form a metallocycle ring, or two X*s are joined to form a chelating ligand, a diene ligand, or an alkylidene ligand; $R^{61}$, $R^{62}$, $R^{63}$, $R^{64}$, $R^{65}$, $R^{66}$ are independently selected from the group consisting of hydrogen, hydrocarbyls, substituted hydrocarbyls, alkoxy, aryloxy, halogen, amino, and silyl, and wherein any one or more adjacent $R^{61}$-$R^{66}$ may be joined to form a substituted or unsubstituted hydrocarbyl or heterocyclic ring, wherein the ring has 5, 6, 7, or 8 ring atoms and where substitutions on the ring can join to form additional rings; each $R^{70}$-$R^{71}$ are independently selected from the group consisting of hydrogen, hydrocarbyls, substituted hydrocarbyls, alkoxy, aryloxy, halogen, amino, and silyl, and wherein any one or more adjacent $R^{70}$-$R^{71}$ may be joined to form a substituted or unsubstituted hydrocarbyl or heterocyclic ring, wherein the ring has 5, 6, 7, or 8 ring atoms and where substitutions on the ring can join to form additional rings, and t is 2 or 3 (corresponding to cyclopentyl and cyclohexyl rings, respectively).

Non-limiting examples of quinolinyldiamido catalysts that are useful herein are illustrated below, wherein X is methyl, benzyl, or chloro:

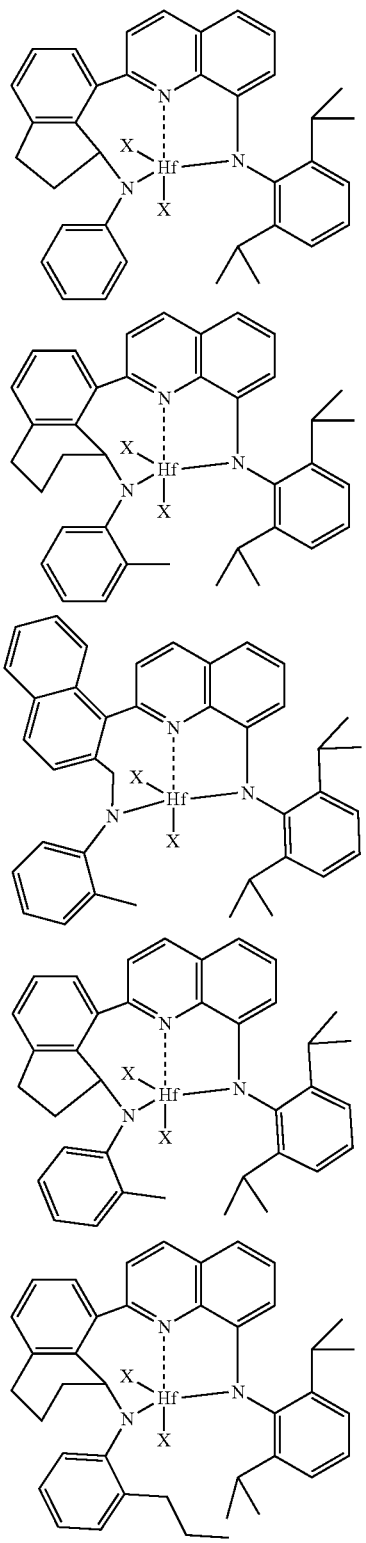

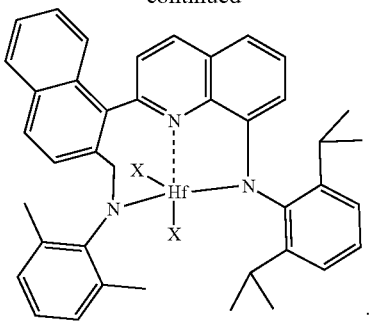

A particularly preferred catalyst is

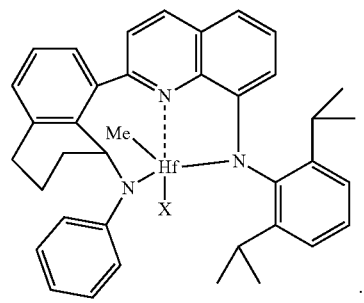

Additional quinolinyldiamido transition metal complexes useful herein are described in US2018/0002352 and are incorporated by reference.

In another embodiment of the invention, the polymerization catalyst compound is represented by the formula (IV):

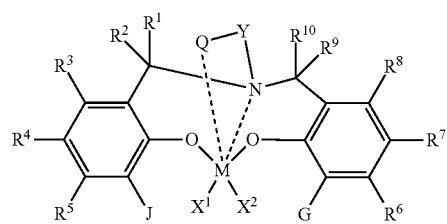

(IV)

where M is a group 4 metal (preferably Hf, Zr or Ti);

$X^1$ and $X^2$ are independently a univalent $C_1$-$C_{20}$ hydrocarbyl, $C_1$-$C_{20}$ substituted hydrocarbyl, a heteroatom or a heteroatom-containing group, or $X^1$ and $X^2$ join together to form a $C_4$-$C_{62}$ cyclic or polycyclic ring structure;

$R^1$, $R^2$, $R^3$, $R^4$, $R^5$, $R^6$, $R^7$, $R^8$, $R^9$, and $R^{10}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof;

Q is a neutral donor group;

J is a substituted or unsubstituted $C_7$-$C_{60}$ fused polycyclic group, where at least one ring is aromatic and where at least one ring, which may or may not be aromatic, has at least five ring atoms;

G is as defined for J or may be hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof; and Y is divalent $C_1$-$C_{20}$ hydrocarbyl or divalent $C_1$-$C_{20}$ substituted hydrocarbyl.

In at least one embodiment, the polymerization catalyst compound is represented by Formula (IVa) or (IVb):

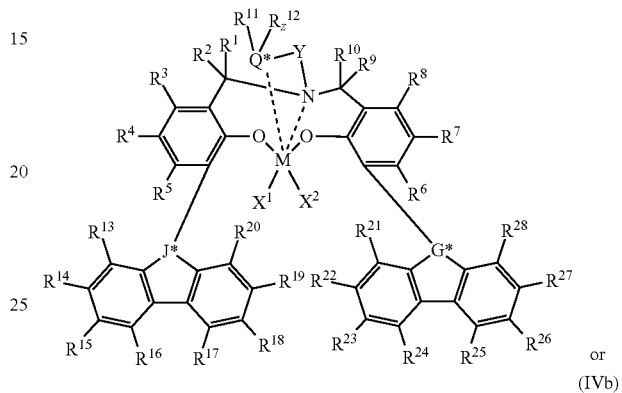

(IVa)

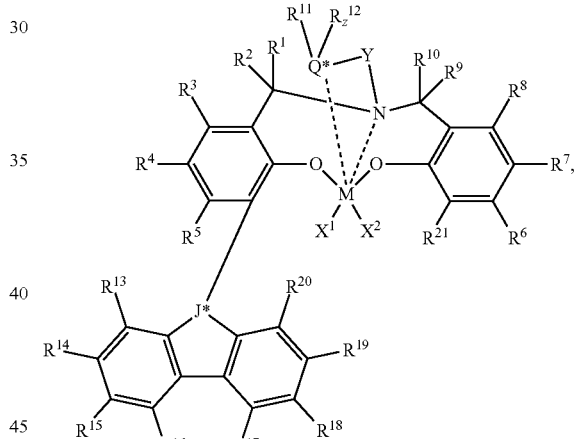

(IVb)

where M is Hf, Zr, or Ti. $X^1$, $X^2$, $R^1$, $R^2$, $R^3$, $R^4$, $R^5$, $R^6$, $R^7$, $R^8$, $R^9$, $R^{10}$, and Y are as defined for Formula (IV); $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently a hydrogen, $C_1$-$C_{40}$ hydrocarbyl, $C_1$-$C_{40}$ substituted hydrocarbyl, a functional group comprising elements from groups 13 to 17, or two or more of $R^1$, $R^2$, $R^3$, $R^4$, $R^5$, $R^6$, $R^7$, $R^8$, $R^9$, $R^{10}R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ may independently join together to form a $C_4$-$C_{62}$ cyclic or polycyclic ring structure, or a combination thereof; $R^{11}$ and $R^{12}$ may join together to form a five- to eight-membered heterocycle; Q* is a group 15 or 16 atom; z is 0 or 1; J* is CR", and G* is CR", where R" is $C_1$-$C_{20}$ hydrocarbyl or carbonyl-containing $C_1$-$C_{20}$ hydrocarbyl.

In at least one embodiment, the polymerization catalyst compound is represented by Formula (V):

(V)

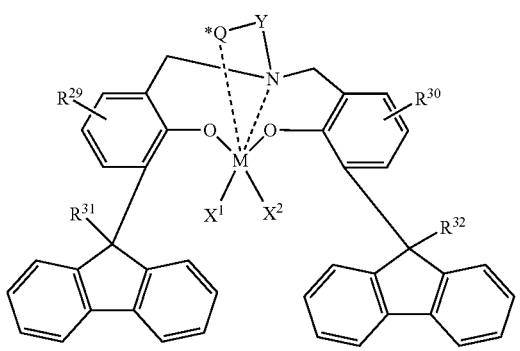

where Y is a divalent $C_1$-$C_3$ hydrocarbyl; Q* is $NR_2$, OR, SR, $PR_2$, where R is as defined for $R^1$ in Formula (IV); M is Zr, Hf, or Ti; each $X^1$ and $X^2$ is independently as defined in Formula (IV); each $R^{29}$ and $R^{10}$ is independently $C_1$-$C_{40}$ hydrocarbyl; each $R^{31}$ and $R^{32}$ is independently linear $C_1$-$C_{20}$ hydrocarbyl, benzyl, or toluyl.

In another embodiment of the invention, the polymerization catalyst compound is represented by Formula (VI):

(VI)

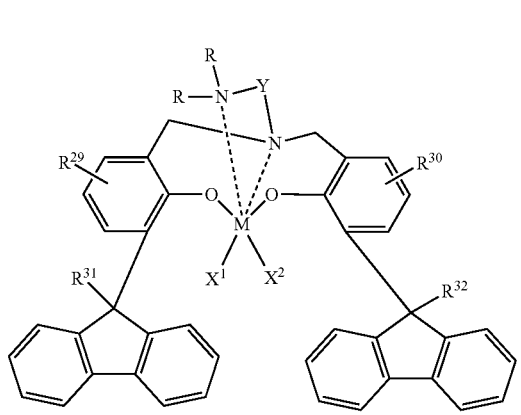

where Y is a divalent $C_1$-$C_3$ hydrocarbyl; each R is independently as defined for $R^1$ in Formula (IV); M is Zr, Hf, or Ti; each $X^1$ and $X^2$ is independently as defined in Formula (IV); each $R^{29}$ and $R^{30}$ is independently $C_1$-$C_{40}$ hydrocarbyl; each $R^{31}$ and $R^{32}$ is independently linear $C_1$-$C_{20}$ hydrocarbyl, benzyl, or tolyl.

The polymerization catalyst compound may be one or more of:

1

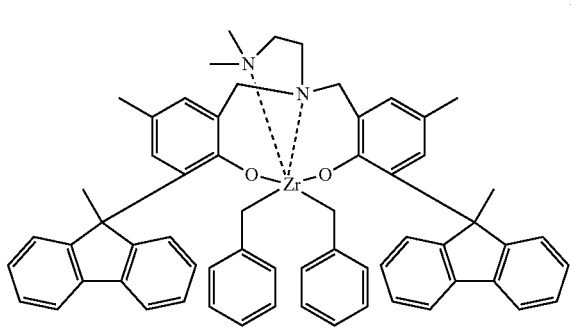

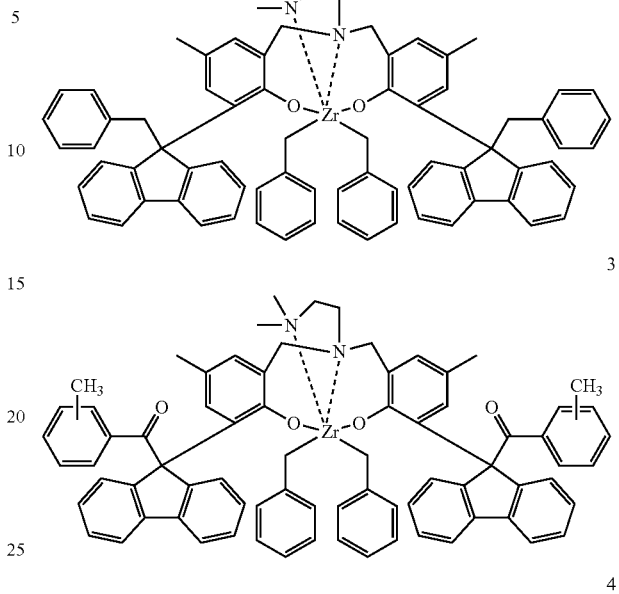

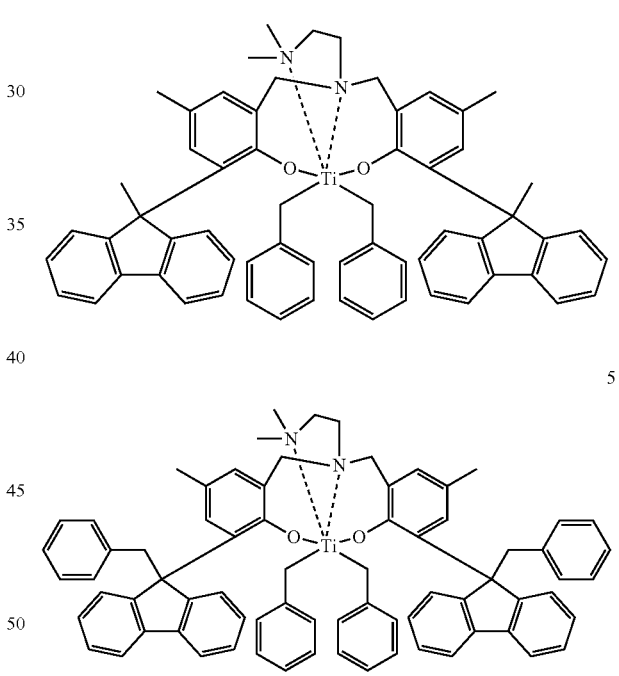

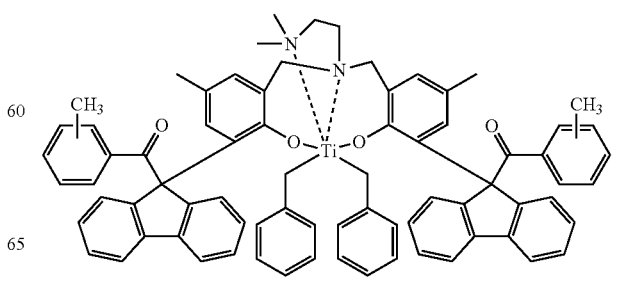

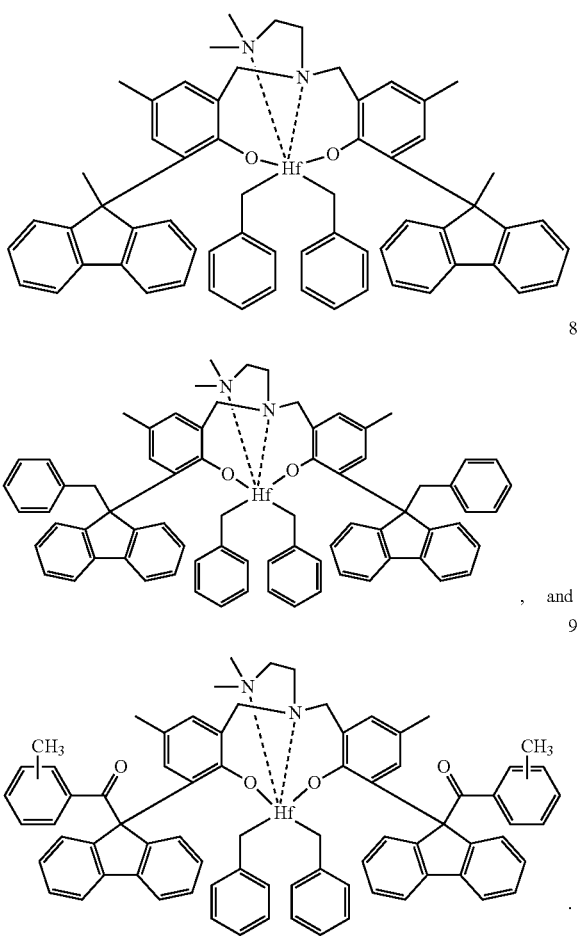

, and

In some useful embodiments of formula IV, at least one of $X^1$ or $X^2$ of Formula IV is a benzyl group, particularly where both of $X^1$ and $X^2$ in Formula IV are benzyl. Additionally or alternatively, particular embodiments include those where Y in formula IV is selected from the group consisting of —CH$_2$CH$_2$—, 1,2-cyclohexylene, and —CH$_2$CH$_2$CH$_2$—.

In any embodiment of the transition metal complexes represented by formula (IV) described herein, each of $X^1$ and $X^2$ is independently selected from the group consisting of hydrocarbyl radicals having from 1 to 20 carbon atoms (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl), hydrides, amides, alkoxides having from 1 to 20 carbon atoms, sulfides, phosphides, halides, sulfoxides, sulfonates, phosphonates, nitrates, carboxylates, carbonates and combinations thereof, preferably each of $X^1$ and $X^2$ is independently selected from the group consisting of halides (F, Cl, Br, I), alkyl radicals having from 1 to 7 carbon atoms (methyl, ethyl, propyl, butyl, pentyl, hexyl, heptyl, and isomers thereof), benzyl radicals, or a combination thereof.

In any embodiment of the transition metal complexes represented by formula (IV) described herein Y is a divalent $C_1$ to $C_{40}$ hydrocarbyl radical or divalent substituted hydrocarbyl radical comprising a portion that comprises a linker backbone comprising from 1 to 18 carbon atoms linking or bridging between Q and N. In any embodiment, Y is selected form the group consisting of divalent $C_1$ to $C_{20}$ alkyl groups, such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl. In any embodiment, Y is selected from the group consisting of ethylene (—CH$_2$CH$_2$—), propylene (—CH$_2$CH$_2$CH$_2$—) and 1,2-cyclohexylene.

In a particular embodiment of the transition metal complexes represented by formula (IV) described herein, each $R^1$, $R^2$, $R^3$, $R^4$, $R^5$, $R^6$, $R^7$, $R^8$, $R^9$, and $R^{10}$ is, independently, a hydrogen, a $C_1$ to $C_{20}$ hydrocarbyl radical, a substituted $C_1$ to $C_{20}$ hydrocarbyl radical, or two or more of $R^1$ to $R^{10}$ may independently join together to form a $C_4$ to $C_{62}$ cyclic or polycyclic ring structure, or a combination thereof.

In any embodiment of the transition metal complexes represented by formula (IV) described herein, each R*, R", $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, and $R^{27}$ is, independently, hydrogen, a halogen, a $C_1$ to $C_{30}$ hydrocarbyl radical, a $C_1$ to $C_{20}$ hydrocarbyl radical, or a $C_1$ to $C_{10}$ hydrocarbyl radical (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl).

In any embodiment of the transition metal complexes represented by formula (IV) described herein, each R*, R", $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, and $R^{27}$ is, independently, a substituted $C_1$ to $C_{30}$ hydrocarbyl radical, a substituted $C_1$ to $C_{20}$ hydrocarbyl radical, or a substituted $C_1$ to $C_{10}$ hydrocarbyl radical (such as 4-fluorophenyl, 4-chlorophenyl, 4-bromophenyl, 4-methoxyphenyl, 4-trifluoromethylphenyl, 4-dimethylaminophenyl, 4-trimethylsilylphenyl, 4-triethylsilylphenyl, trifluoromethyl, fluoromethyl, trichloromethyl, chloromethyl, mesityl, methylthio, phenylthio, (trimethylsilyl)methyl, and (triphenylsilyl)methyl).

In any embodiment of the transition metal complexes represented by formula (IV) described herein, one or more of R*, R", $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, and $R^{27}$ is a methyl radical, a fluoride, chloride, bromide, iodide, methoxy, ethoxy, isopropoxy, trifluoromethyl, dimethylamino, diphenylamino, adamantyl, phenyl, pentafluorphenyl, naphthyl, anthracenyl, dimethylphosphanyl, diisopropylphosphanyl, diphenylphosphanyl, methylthio, and phenylthio or a combination thereof.

In any embodiment of the transition metal complexes represented by Formula (IV) described herein, Q* is N, O, S, or P, preferably N, O, or S, preferably N or O, preferably N. In any embodiment of the transition metal complexes described herein when Q* is a group 15 atom, z is 1, and when Q* is a group 16 atom, z is 0.

In any embodiment of the transition metal complexes represented by Formula (IV) described herein, Q is preferably a neutral donor group comprising at least one atom from group 15 or 16, preferably Q is NR'$_2$, OR', SR', PR'$_2$, where R' is as defined for $R^1$ (preferably R' is methyl, ethyl, propyl, isopropyl, phenyl, cyclohexyl or linked together to form a five-membered ring such as pyrrolidinyl or a six-membered ring such as piperidinyl), preferably the -(-Q-Y—)— fragment can form a substituted or unsubstituted heterocycle which may or may not be aromatic and may have multiple fused rings. In any embodiment of the transition metal complexes described herein, Q is preferably an amine, ether, or pyridine. In any embodiment of the transition metal complexes described herein, Q is preferably an amine In a particular embodiment of the transition metal complexes represented by Formula (IV) described herein, G* and J* are the same, preferably G* and J* are N, alternately G* and J* are CR''', where each R''' is H or a $C_1$ to $C_{12}$ hydrocarbyl or substituted hydrocarbyl (such as methyl, ethyl, ethenyl and isomers of propyl, butyl, pentyl, hexyl, heptyl, octyl, nonyl, decyl, undecyl, dodecyl, trifluoromethylphenyl, tolyl, phenyl, methoxyphenyl, tertbutylphenyl, fluorophenyl, diphenyl, dimethylaminophenyl, chlorophenyl, bromophenyl, iodophenyl, (trimethylsilyl)phenyl, (triethylsilyl)phenyl, (triethylsilyl)methyl, (triethylsilyl)methyl). In a useful embodiment of the transition metal complexes described herein, G* and J* are different.

In a particular embodiment of the transition metal complexes represented by Formula (IV) described herein, G and J are the same, preferably G and J are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, or substituted fluorenyl. In a useful embodiment of the transition metal complexes described herein, G and J are different.

In an embodiment represented by Formula (IV), M is Zr or Hf; $X^1$ and $X^2$ are chloride, bromide, methyl, or benzyl radicals; $R^4$ and $R^7$ are methyl radicals; IV through $R^3$, $R^5$ through $R^6$ and $R^8$ through $R^{10}$ are hydrogen; and Y is ethylene, (—$CH_2CH_2$—), Q is an N-containing group, G and J are carbazolyl, substituted carbazolyl, fluorenyl or substituted fluorenyl. In a preferred combination, G and J are fluorenyl or substituted fluorenyl and Q is an amine group.

In a particularly preferred embodiment of the invention, the polymerization catalyst complex is represented by formula:

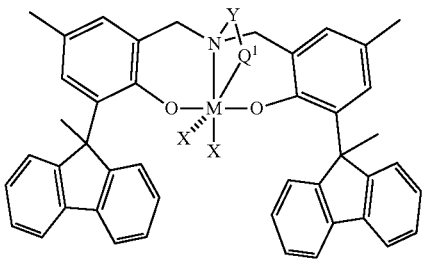

where Y is a $C_1$ to $C_3$ divalent hydrocarbyl, $Q^1$ is NR'$_2$, OR', SR', PR'$_2$, (preferably NR'$_2$) where R is as defined for $R^1$ (preferably R' is methyl, ethyl, propyl, isopropyl, phenyl, cyclohexyl or linked together to form a five-membered ring such as pyrrolidinyl or a six-membered ring such as piperidinyl), alternately the -(-Q-Y—)— fragment can form a substituted or unsubstituted heterocycle which may or may not be aromatic and may have multiple fused rings, M is Zr, Hf or Ti and each X is, independently, as defined for V above, preferably each X is benzyl, methyl, ethyl, chloride, bromide or alkoxide.

Particular catalysts according to Formula IV and methods to prepare them are further described in U.S. Ser. No. 15/242,357, filed Aug. 19, 2016, which is incorporated herein by reference in its entirety.

In some embodiments, two or more different polymerization catalyst compounds may be present in the catalyst system used herein. In some embodiments, two or more different polymerization catalyst compounds may be present in the reaction zone where the polymerization process(es) described herein occur. When any two polymerization catalyst compounds are used in one reactor as a mixed catalyst system, the catalyst compounds can preferably be chosen to be compatible with each other (and with the activator and/or other components of the polymerization catalyst system). A simple screening method such as by $^1H$ or $^{13}C$ NMR, known to those of ordinary skill in the art, can be used to determine which catalyst compounds are compatible. In many embodiments, it can be preferable to use the same activator for the multiple catalyst compounds, although two different activators, such as a activator described herein with a boron containing non-coordinating anion activator and/or an alkylalumoxane, can be used in combination, if desired.

When more than at least two polymerization catalyst compounds are used in a mixed catalyst system, the catalyst compounds may be used in any reasonable ratio. Between any two catalyst compounds, the molar ratios of one to the other may fall within the range of 1:1000 to 1000:1, such as 1:100 to 500:1, 1:10 to 200:1, 1:1 to 100:1, 1:1 to 75:1, or 5:1 to 50:1. The particular ratio chosen can depend inter alia on the exact catalyst compounds chosen, the method of activation, and the end product desired.

I.2 Activators and Activation of the Polymerization Catalyst Compound

An additional component of a catalyst system described herein may be an activator. The terms "cocatalyst" and "activator" are used herein interchangeably and are defined to be any compound which can activate any one of the catalyst compounds described above by converting the neutral catalyst compound to a catalytically active catalyst compound cation.

After the polymerization catalyst compounds or complexes described above have been synthesized, catalyst systems may be formed by combining them with activators in any manner known from the literature including by adding them to or generating them in solution polymerization or bulk polymerization (in the monomer).

A co-activator is a compound capable of alkylating the (transition) metal complex, such that when used in combination with an activator, an active catalyst can be formed. Co-activators can include Lewis acid activators and can sometimes be used in combination with activators and ionic activators when the pre-catalyst is not a dihydrocarbyl or dihydride complex. Sometimes co-activators may also be used as scavengers to deactivate impurities in feed or reactors. Activators and co-activators may be labelled interchangeably, as the determination of which is an activator and which is a co-activator can sometimes be arbitrary.

A typical activator-to-catalyst ratio, e.g., all-activators-to-catalyst ratio, is approximately a 1:1 molar ratio. Activator-to-catalyst ratios can, nevertheless, range from 0.1:1 to 100:1, alternatively from 0.5:1 to 200:1, alternatively from 1:1 to 500:1, or alternatively from 1:1 to 1000:1. A particularly useful activator-to-catalyst ratio range can be from 0.5:1 to 10:1 or from 1:1 to 5:1.

Preferably, the group 8 or 9 NCA's described herein have an activator-to-catalyst molar ratio of approximately a 1:1, however the activator to catalyst ratio can range from 0.1:1 to 100:1, alternatively from 0.5:1 to 200:1, alternatively from 1:1 to 500:1, or alternatively from 1:1 to 1000:1. A particularly useful group 8 or 9 NCA-to-catalyst ratio range can be from 0.5:1 to 10:1 or from 1:1 to 5:1.

Non-limiting co-activators, for example, include alumoxanes, aluminum alkyls, ionizing activators, which may be neutral or ionic, and conventional-type cocatalysts. Exemplary activators may include alumoxane compounds such as methylalumoxane, modified alumoxane compounds such as modified methylalumoxane, and ionizing anion precursor compounds that abstract a reactive, σ-bound, metal ligand making the metal complex cationic and providing a charge-balancing noncoordinating or weakly coordinating anion, as well as combinations thereof. Additionally or alternatively, co-activators may include aluminum alkyls such trimethylaluminum, tri-isobutylaluminum, triethylaluminum, and tri-isopropylaluminum, tri-n-hexylaluminum, tri-n-octylaluminum, tri-n-decylaluminum or tri-n-dodecylaluminum, or the like, as well as a combination thereof. In certain catalyst systems, e.g., where catalyst compounds and/or activators are present predominantly (or fully) in a solid phase or as supported on a solid-phase particle, such co-activators may be present as sole activators. Conventionally, such systems are most often used in suspension, slurry, or gas phase (with reaction occurring at a gas-solid interface) polymerizations.

In some embodiments, however, it may be desirable to utilize mostly or substantially liquid phase polymerization reactions, such as homogeneous, solution, or bulk polymerizations—in those embodiments, activators that have reasonable, significant, or substantial solubility in a liquid-phase medium may be particularly useful (e.g., the inventive activators described herein).

I.2.A. Inventive Activators

In preferred embodiments, the inventive activators described herein are utilized as an activator in the catalyst system, particularly in embodiments where catalyst compounds and/or activators are present predominantly (or fully) in a liquid phase, such as where catalyst compounds and/or activators exhibit more than a relatively small solubility in the reaction medium (media; e.g., monomers/comonomers for bulk polymerizations and traditional hydrocarbonaceous solvents for solution polymerizations).

Particularly useful activators include one or more of: hydrogen cobalt tetrakis(perfluorophosphine), potassium cobalt tetrakis(perfluorophosphine), and dimethylanilinium cobalt tetrakis(perfluorophosphine).

In some embodiments, however, the activators are limited to exclude ionic complexes of metals with single-atom, non-hydrogen counterions (e.g., excluding potassium cobalt tetrakis(perfluorophosphine)); without being bound by theory, it is postulated that, in some embodiments, substantially ionically-bonded single-atom counterions, such as group 1 (except hydrogen) or group 2 cations, may not fully enable effective activation of certain polymerization catalyst compounds, thereby not fully engaging in their function as "activators" in the polymerization catalyst systems according to the invention.

This invention also relates to a non-coordinating anion activator comprising an anion represented by the formula: $[H_sL_mM]^{d-}$, where M is a group 8 or 9 metal (preferably Co, Fe, Ru, Rh, Os, Ir or a combination thereof, preferably Co), s is 0 or 1, m is the number of L ligands, typically 1, 2, 3, or 4, each L ligand is independently C≡O, $NR_3$, $PR_3$ (where each R, independently, is halogen, haloalkyl, or haloaryl) or optionally two or more L ligands may together form a multiply-valent ligand complex, and d is 1, 2, or 3.

This invention also relates to a non-coordinating anion activator composition represented by the formula: $[Z_d]^+$ $[H_sL_mM]^{d-}$, where M is a group 8 or 9 metal, s is 0 or 1, m is the number of L ligands, typically 1, 2, 3, or 4, each L ligand is independently C≡O, $NR_3$, $PR_3$ (where each R, independently is halogen, haloalkyl, or haloaryl, preferably a per halogenated alkyl or aryl, preferably a perfluorinated alkyl or aryl) or optionally two or more L ligands may together form a multiply-valent ligand complex, d is 1, 2, or 3 and Z is (L'-H) or a reducible Lewis acid; L' is a neutral Lewis base; H is hydrogen, and (L'-H) is a Bronsted acid.

This invention also relates to the reaction product of a polymerization catalyst and a non-coordinating anion activator composition represented by the formula: $[Z_d]^+$ $[H_sL_mM]^{d-}$, where M is a group 8 or 9 metal (preferably Co, Fe, Ru, Rh, Os, Ir or a combination thereof, preferably Co), s is 0 or 1, m is the number of L ligands, typically 1, 2, 3, or 4, each L ligand is independently C≡O, $NR_3$, $PR_3$ (where each R, independently is halogen, haloalkyl, or haloaryl, preferably a per halogenated alkyl or aryl, preferably a perfluorinated alkyl or aryl) or optionally two or more L ligands may together form a multiply-valent ligand complex, d is 1, 2, or 3 and Z is (L'-H) or a reducible Lewis acid; L' is a neutral Lewis base; H is hydrogen, and (L'-H) is a Bronsted acid.

Preferably, M is Co, Fe, Ru, Rh, Os, Ir or a combination thereof, preferably Co.

Preferably, each L ligand is independently C≡O, $NR_3$, $PR_3$ (where each R, independently, is halogen, haloalkyl, or haloaryl, preferably each R is a fluorinated hydrocarbyl group (e.g., a fluorinated aryl group, such as a perfluoroaryl group) having 1 to 20 carbon atoms), such as perfluorophenyl, perfluoronaphthyl, and the like.

In a preferred embodiment of the invention, L is C≡O, $NR_3$, $PR_3$, where each R, independently is F, Cl, Br, a C1 to C20 haloalkyl, or C5 to C20 haloaryl, preferably a perhalogenated alkyl or aryl, preferably a perfluorinated C1 to C20 alkyl or a C5 to C20 perfluorinated aryl).

In a preferred embodiment of the invention, each L ligand is independently a perfluorophosphine, tris(perfluorophenyl)phosphine, or tris(perfluoronaphthyl)phosphine, or other phosphines of the formula $P(R^3)(R^4)(R^5)$, $P(OR^3)(R^4)(R^5)$, $P(OR^3)(OR^4)(OR^5)$, $P(OR^3)(OR^4)(OR^5)$ where each $R^3$, $R^4$, $R^5$ is independently a partially or fully fluorinated aryl or alkyl group and where each $R^3$, $R^4$, $R^5$ can form a bridge to another R group bound to the same P atom or to an R group bound to another P atom, preferably each $R^3$, $R^4$, $R^5$ can form a bridge to make a chelating ligand.

Alternately, two or more L ligands may together form a multiply-valent ligand complex.

In preferred embodiments of the invention, each L ligand is independently carbon monoxide, perfluoroamine, tris(perfluorophenyl)amine, or tris(perfluoronaphthyl)amine, perfluorophosphine, tris(perfluorophenyl)phosphine, tris(perfluoronaphthyl)phosphine, and the like.

In a preferred embodiment, when Z is (L'-H) such that the cation component is (L'-H)d+, the cation component may include Bronsted acids such as protonated Lewis bases capable of protonating a moiety, such as an alkyl or aryl, from the catalyst precursor, resulting in a cationic transition metal species, or the activating cation (L'-H)d+ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

In a useful embodiment, (L'-H)d+ is a Bronsted acid selected from ammoniums, oxoniums, phosphoniums, syliums, and mixtures thereof.

When Z is a reducible Lewis acid, it may be represented by the formula: ($Ar_3C+$), where Ar is aryl or aryl substituted with a heteroatom, or a $C_1$ to $C_{40}$ hydrocarbyl, the reducible Lewis acid may be represented by the formula: ($Ph_3C+$), where Ph is phenyl or phenyl substituted with a heteroatom, and/or a $C_1$ to $C_{40}$ hydrocarbyl. In an embodiment, the reducible Lewis acid is triphenyl carbenium.

Preferred L' groups are independently a hydride, bridged or unbridged dialkylamido, halide, alkoxide, substituted alkoxide, aryloxide, a substituted aryloxide, hydrocarbyl, substituted hydrocarbyl, halocarbyl, substituted halocarbyl, and halosubstituted-hydrocarbyl radicals, said L having up to 20 carbon atoms.

In a preferred embodiment Z is N,N-dialkylanilinium, N,N-dimethyl-(2,4,6-trimethylanilinium) trialkylammonium, N,N-dialkyl-(2,4,6-trimethylanilinium), or di-(i-propyl)ammonium, (where alkyl is methyl, ethyl, propyl, n-butyl, sec-butyl, or t-butyl).

In preferred embodiments of the invention, Z is one or more of trimethylammonium, N,N-dimethylanilinium, N,N-diethylanilinium, and triphenylcarbenium.

Compounds that can be useful as activators in the polymerization catalyst systems herein also include those represented by the formula: $[H(R^1)(R^2)(R^3)N^+][(L)_mM^-]$ (formula A2). In formula A2, M can broadly comprise any atom having a d-orbital; however, in most embodiments, M is a group 8 or 9 transition metal (e.g., iron, cobalt, ruthenium, rhodium osmium, iridium, or a combination thereof) having an coordination number of v; preferably, v is greater than 1 (such as 2, 3, 4, 5, 6, 7 or 8, preferably 2, 3 or 4). In some embodiments, M can comprise, consist essentially of, or be iron, cobalt, rhodium, or a combination thereof. In some embodiments, M can comprise cobalt, iron, or a combination thereof, e.g., at least including cobalt. Preferably, m represents the number of L ligands and can be an integer equal to v-1 (such as 1, 2, or 3). In both formulas, each L ligand can independently be a singly-valent organic or inorganic moiety (preferably perhalogenated), or optionally two or more L ligands may together form a multiply-valent ligand complex. In some embodiments, each L ligand can independently be a perfluorophosphine, tris(perfluorophenyl)phosphine, or tris(perfluoronaphthyl)phosphine. In formula (A2), each $R^1$, $R^2$, and $R^3$ can independently be a substituted or unsubstituted linear, branched linear, or cyclic C1-C30 (e.g., C1-C8) hydrocarbyl group, or two or more of $R^1$, $R^2$, and $R^3$, taken together, collectively form one or more substituted or unsubstituted heterocyclic rings containing the nitrogen atom described in formula (A2).

This invention further relates to polymerization catalyst systems where the activator comprises a compound represented by the formula: $H_s(L)_mM$ or an ammonium salt of its conjugate base represented by the formula: $[HN(R^1)(R^2)(R^3)N^+][(L)_nM^-]$, wherein: M is a transition metal from Groups 3 to 10, preferably from Group 6, 7, 8, 9 and/or 10 (preferably M is Co); s is 0 or 1, m is 2, 3, 4, 5, 6, 7, or 8 (typically indicating the number of neutral or anionic L ligands); each L ligand is independently a neutral or anionic organic or inorganic moiety which may or may not be bridged to one or more L ligands; n is 2, 3, 4, 5, 6, 7, or 8 (typically indicating the number of neutral or anionic L ligands) and each $R^1$, $R^2$, and $R^3$ is independently a substituted or unsubstituted linear, branched linear, branched, or cyclic C1-C30 (preferably C1-C8) hydrocarbyl group, or two or more of $R^1$, $R^2$, and $R^3$, taken together, collectively form a substituted or unsubstituted heterocyclic ring system with at least one ring containing the nitrogen atom.

In some embodiments, M may comprise iron, cobalt, ruthenium, rhodium, osmium, iridium, or a combination thereof. In a particular embodiment, M comprises cobalt.

In some embodiments, each L ligand can independently be a perfluorophosphine, tris(perfluorophenyl)phosphine, or tris(perfluoronaphthyl)phosphine.

Preferably the activator described herein is combined with a catalyst compound. In some embodiments, the polymerization catalyst compound can comprise a pyridylamine catalyst, a pyridyl-diimine catalyst, a diamidoamine catalyst, a phosphinimine catalyst, a diimine catalyst, a diamide catalyst, a pyrrolidineimine catalyst, a phenoxydiamine catalyst, a diphenoxy amine catalyst, diphenoxy diamine catalyst, a catalyst with two phenoxy groups bridged by a moiety with two coordinating atoms, a phenoxyimine catalyst, a bisphenylphenol catalyst, a bridged metallocene catalyst, an unbridged metallocene catalyst, or a combination thereof, e.g., as well as a group 4 metal, such as hafnium and/or zirconium. In a particular embodiment, the polymerization catalyst compound comprises a zirconium diphenoxy diamine catalyst.

In some embodiments, the scavenger is present and may comprise diethyl zinc, methylalumoxane, trimethylaluminum, triethyl aluminum, triisobutylaluminum, trioctylaluminum, or a combination thereof.

In particularly useful embodiments, the activator comprises hydrogen cobalt tetrakis(perfluorophosphine), potassium cobalt tetrakis(perfluorophosphine), dimethylanilinium cobalt tetrakis(perfluorophosphine), hydrogen cobalt tetrakis(tri(perfluorophenyl)phosphine), potassium cobalt tetrakis(tri(perfluorophenyl)phosphine), dimethylanilinium cobalt tetrakis(tri(perfluorophenyl)phosphine), or a combination thereof; the scavenger is present and comprises a C1-C18 trialkylaluminum compound; and the polymerization catalyst compound comprises a zirconium metallocene compound, a hafnium metallocene compound, a titanium metallocene compound, or a combination thereof.

In a particularly preferred embodiment of the invention M is cobalt.

In preferred embodiments of the invention, each L ligand is independently a perfluorophosphine, tris(perfluorophenyl)phosphine, or tris(perfluoronaphthyl)phosphine.

In preferred embodiments of the invention, s is 0.
In preferred embodiments of the invention, m is 4.
In preferred embodiments of the invention, M is cobalt.
In preferred embodiments of the invention, s is 0, m is 4, and M is cobalt.
In preferred embodiments of the invention, s is 1, m is 4, and M is cobalt.

In preferred embodiments of the invention, each $R^1$, $R^2$, and $R^3$ is independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthyl, cyclohexyl, cyclohexenyl, methylcyclohexyl, and isomers thereof.

In preferred embodiments of the invention, s is 0, m is 4, M is cobalt, each $R^1$, $R^2$, and $R^3$ is independently selected from methyl, ethyl, propyl, butyl, pentyl, hexyl, heptyl, octyl, nonyl, decyl, undecyl, dodecyl, and isomers thereof; and each L is independently a prefluoroaryl group, such as perfluorophosphine, tris(perfluorophenyl)phosphine, or tris (perfluoronaphthyl)phosphine.

In some embodiments, the activators useful in the polymerization catalyst systems and polymerization methods according to the invention can exhibit thermal stability by having a decomposition temperature above about 85° C. (e.g., above about 100° C., above about 115° C., above about 130° C., above about 145° C., above about 160° C., above about 175° C., above about 190° C., or above about 200° C.), can exhibit Bronsted acidity with a pKa (in aqueous or organic media) less than about 40 (e.g., less than about 35, less than about 30, less than about 25, less than about 20, or less than about 15), or both.

In some embodiments, the activator comprises hydrogen cobalt tetrakis(perfluorophosphine), potassium cobalt tetrakis(perfluorophosphine), dimethyl-anilinium cobalt tetrakis(perfluorophosphine), hydrogen cobalt tetrakis(tri(perfluorophenyl)phosphine), potassium cobalt tetrakis(tri (perfluorophenyl)phosphine), dimethylanilinium cobalt tetrakis(tri(perfluorophenyl)phenylphosphine), or a combination thereof. In some embodiments, the activator can comprise hydrogen cobalt tetrakis(perfluorophosphine), dimethylanilinium cobalt tetrakis(perfluorophosphine), hydrogen cobalt tetrakis(tri(perfluorophenyl)phosphine), dimethylanilinium cobalt tetrakis(tri(perfluorophenyl)phosphine), or a combination thereof.

In an embodiment, two NCA activators may be used in the polymerization and the molar ratio of the first NCA activator to the second NCA activator can be any ratio. In an embodiment, the molar ratio of the first NCA activator to the second NCA activator is 0.01:1 to 10,000:1, or 0.1:1 to 1000:1, or 1:1 to 100:1.

I.2.B. Alumoxane Co-activators

In some embodiments, e.g., where catalyst compounds and/or activators are present predominantly (or fully) in a solid phase or as supported on a solid-phase particle, alumoxane co-activators can be utilized as a co-activator in the catalyst system. In embodiments employing a liquid phase, though alumoxanes have rather low solubility in most liquid-phase media (e.g., in monomers/co-monomers for bulk polymerizations and in traditional hydrocarbonaceous solvents for solution polymerizations), alumoxanes may be used as co-activators, along with the inventive activators, even if their relatively low solubility introduces a relatively small amount of solid-phase material into a solution polymerization, a bulk polymerization, or an otherwise homogeneous polymerization system.

Alumoxanes are generally oligomeric compounds containing —Al(R)—O— sub-units, where R is an alkyl group. Examples of alumoxanes include methylalumoxane (MAO), modified methylalumoxane (MMAO), ethylalumoxane, and isobutylalumoxane. Alkylalumoxanes and modified alkylalumoxanes can be suitable as catalyst co-activators, particularly when the abstractable ligand is an alkyl, halide, alkoxide, substituted alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the co-activator comprises or is an alumoxane (modified or unmodified), some embodiments may select the maximum amount of co-activator at up to a 5000-fold molar excess Al/M over the catalyst compound (per metal catalytic site). In some embodiments, a minimum co-activator-to-catalyst is a 1:10 molar ratio, with acceptable ranges including from 1:1 to 500:1, from 1:1 to 200:1, from 1:1 to 100:1, or from 1:1 to 50:1.

In alternate embodiments, such as in solution, bulk, or otherwise homogeneous polymerization systems, little or no alumoxanes can be used in the polymerization processes described herein. In such embodiments, alumoxanes can be present in the polymerization system at about 0 mol %, or alternatively at a molar ratio of aluminum to catalyst compound transition metal less than 500:1, less than 300:1, less than 100:1, less than 1:1, less than 1:10, or less than 1:100.

I.2.C. Non Coordinating Anion Activators

The above group 8 or 9 non-coordinating anion activators may be combined with traditional (e.g., non-group 8 or 9) noncoordinating anion activators. The term traditional NCA is also defined to include multicomponent NCA-containing activators, such as N,N-dimethylanilinium tetrakis(pentafluorophenyl)borate, that contain an acidic cationic group and the non-coordinating anion. The term traditional NCA is also defined to include neutral Lewis acids (including but not limited to Bronsted acids), such as tris(pentafluorophenyl)borane, that can react with a catalyst to form an activated species by abstraction of an anionic group. Any non-group 8 or 9 metal or metalloid that can form a compatible, weakly coordinating complex may be used or contained in the traditional noncoordinating anion. As defined herein, traditional noncoordinating anions (tNCA) do not include Group 8 or 9 compounds, as described above, which are considered a separate category of non-coordinating anion activators. Suitable metals for traditional noncoordinating anions may include, but are not limited to, aluminum, gold, and platinum. Suitable metalloids for traditional noncoordinating anions may include, but are not limited to, boron, aluminum, phosphorus, and silicon.

In some embodiments, e.g., where catalyst compounds and/or activators are present predominantly (or fully) in a solid phase or as supported on a solid-phase particle, tNCA activators can be utilized as an activator in the catalyst system. In embodiments employing a liquid phase, though most tNCA activators have rather low solubility in most liquid-phase media (e.g., in monomers/co-monomers for bulk polymerizations and in traditional hydrocarbonaceous solvents for solution polymerizations), tNCAs may be used as co-activators, along with the inventive activators described herein, even if their relatively low solubility introduces a relatively small amount of solid-phase material into a solution polymerization, a bulk polymerization, or an otherwise homogeneous polymerization system.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Useful non-coordinating anions can be compatible, can stabilize the catalyst metal cation in the sense of balancing its ionic charge at +1, and yet can retain sufficient lability to permit displacement during polymerization.

In some embodiments, a co-activator can comprise, consist essentially of, or be tri(n-butyl)ammonium tetrakis(pentafluorophenyl)borate, a tris(perfluorophenyl)borane metalloid precursor or a tris(perfluoronaphthyl)borane metalloid precursor, or polyhalogenated heteroborate anions (PCT Publication No. WO 98/43983), boric acid (U.S. Pat. No. 5,942,459), or a combination thereof.

In some embodiments, boron containing tNCA co-activators can be used, as represented by the formula: $Z'_d{}^+ (A^{d-})$, wherein: Z' is (L"-H) or a reducible Lewis acid; L" is a neutral Lewis base; H is hydrogen; (L"-H) is a Bronsted acid, and $A^{d-}$ is a boron-containing non-coordinating anion having the charge d−, with d being 1, 2, or 3.

The cation component, $Z'_d{}^+$ may include Bronsted acids such as protons or protonated Lewis bases or reducible Lewis acids capable of protonating or abstracting a moiety, such as an alkyl or aryl, from the transition metal catalyst precursor, resulting in a cationic transition metal species.

The activating cation $Z'_d{}^+$ may additionally or alternatively be a moiety such as silver, tropylium, carboniums, ferroceniums and mixtures, preferably carboniums and ferroceniums. In some embodiments, $Z'_d{}^+$ is triphenylcarbonium. In particular embodiments, reducible Lewis acids can be any triaryl carbonium (where the aryl can be substituted or unsubstituted, such as those represented by the formula: $(Ar_3C)+$, where Ar is aryl or aryl substituted with a heteroatom, a C1 to C40 hydrocarbyl, or a substituted C1 to C40 hydrocarbyl), such as where Z' comprises ($Ph_3C$) with each Ph being independently an unsubstituted phenyl or a phenyl substituted with one or more C1 to C40 hydrocarbyls, such as one or more substituted or unsubstituted C1 to C20 alkyls or aromatics.

When $Z'_d{}^+$ is the activating cation $(L"-H)_d{}^+$, it can be a Bronsted acid, capable of donating a proton to the transition metal catalytic precursor resulting in a transition metal cation, including ammoniums, oxoniums, phosphoniums, silyliums, and mixtures thereof, e.g., ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ can include those having the formula $[M^{k+}Q_n]^{d-}$, wherein k is 1, 2, or 3; n is 1, 2, 3, 4, 5, or 6 (e.g., 1, 2, 3, or 4); n−k=d; M is a group 13 element, preferably boron or aluminum, and Q is independently a hydride, bridged or unbridged dialkylamido, halide, alkoxide, substituted alkoxide, aryloxide, a substituted aryloxide, hydrocarbyl, substituted hydrocarbyl, halocarbyl, substituted halocarbyl, and halosubstituted-hydrocarbyl radicals, said Q having up to 20 carbon atoms, with the proviso that in not more than 1 occurrence is Q a halide. In some embodiments, each Q is a fluorinated hydrocarbyl group (e.g., a fluorinated aryl group, such as a perfluoroaryl group) having 1 to 20 carbon atoms. Examples of suitable $A^{d-}$ may additionally or alternatively include diboron compounds, such as disclosed in U.S. Pat. No. 5,447,895, which is fully incorporated herein by reference.

In some embodiments, the co-activator can comprise, consist essentially of, or be one or more of a trialkylammonium tetrakis(pentafluorophenyl)borate, an N,N-dialkylanilinium tetrakis(pentafluorophenyl)borate, N,N-dimethyl-(2,4,6-trimethylanilinium) tetrakis(pentafluorophenyl)borate, a trialkylammonium tetrakis(2,3,4,6-tetrafluorophenyl)borate, an N,N-dialkylanilinium tetrakis (2,3,4,6-tetrafluorophenyl)borate, trialkylammonium tetrakis(perfluoronaphthyl)borate, an N,N-dialkylanilinium tetrakis(perfluoronaphthyl)borate, a trialkylammonium tetrakis(perfluorobiphenyl)borate, an N,N-dialkylanilinium tetrakis(perfluorobiphenyl)borate, a trialkylammonium tetrakis(3,5-bis(trifluoromethyl)perfluorophenyl)borate, an N,N-dialkylanilinium tetrakis(3,5-bis(trifluoromethyl)perfluorophenyl)borate, an N,N-dialkyl-(2,4,6-trimethylanilinium) tetrakis(3,5-bis(trifluoromethyl)perfluorophenyl) borate, and a di-(isopropyl)ammonium tetrakis (pentafluorophenyl)borate, with each alkyl independently being a methyl, an ethyl, a propyl, n-butyl, sec-butyl, or t-butyl.

In some embodiments, the co-activator $Z'_d{}^+(A^{d-})$ can comprise, consist essentially of, or be one or more of N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl) perfluorophenyl)borate, N,N-dimethylanilinium tetrakis (perfluorophenyl)aluminate, N,N-dimethylanilinium tetrakis(perfluoronaphthyl)aluminate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)perfluorophenyl)borate, triphenylcarbenium tetra(perfluorophenyl)borate, triphenylcarbenium tetrakis(perfluorophenyl)aluminate, triphenylcarbenium tetrakis(perfluoronaphthyl)aluminate, [$Ph_3C+$][B$(C_6F_5)_4{}^-$], [$Me_3NH+$][B$(C_6F_5)_4{}^-$], 1-(4-(tris (pentafluorophenyl)borate)-2,3,5,6-tetrafluorophenyl) pyrrolidinium, and 4-(tris(pentafluorophenyl)borate)-2,3,5, 6-tetrafluoropyridine.

In some embodiments, the co-activator can comprise a triaryl carbonium (such as one or more of triphenylcarbenium tetraphenylborate, triphenylcarbenium tetrakis(pentafluorophenyl)borate, triphenylcarbenium tetrakis(2,3,4,6-tetrafluorophenyl)borate, triphenylcarbenium tetrakis (perfluoronaphthyl)borate, triphenylcarbenium tetrakis (perfluorobiphenyl)borate, and triphenylcarbenium tetrakis (3,5-bis(trifluoromethyl)phenyl)borate).

Bulky co-activators may also be useful herein as tNCAs. "Bulky co-activator" as used herein refers to anionic activators represented by the formula:

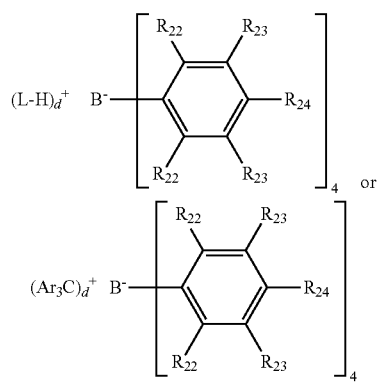

where: each $R^{22}$ is, independently, a halide, preferably a fluoride; Ar is substituted or unsubstituted aryl group (preferably a substituted or unsubstituted phenyl), e.g., substituted with C1 to C40 (such as C1 to C20) hydrocarbyls (such as alkyls or aromatics); each $R^{23}$ is, independently, a halide, a C6 to C20 substituted aromatic hydrocarbyl group, or a siloxy group of the formula —O—Si—$R_A$, where $R_A$ is a C1 to C20 hydrocarbyl or hydrocarbylsilyl group (e.g., a fluoride or a perfluorinated phenyl group); each $R^{24}$ is a halide, a C6 to C20 substituted aromatic hydrocarbyl group, or a siloxy group of the formula —O—Si—$R_A$, where $R_A$ is a C1 to C20 hydrocarbyl or hydrocarbylsilyl group (e.g., a fluoride or a C6 perfluorinated aromatic hydrocarbyl group); wherein one $R^{23}$ and $R^{24}$ can form one or more saturated or unsaturated, substituted or unsubstituted rings (e.g., one $R^{23}$ and $R^{24}$ form a perfluorinated phenyl ring); and L is an neutral Lewis base; (L-H)+ is a Bronsted acid, with d being 1, 2, or 3 (typically 1). In particular embodiments, the anion can have a molecular weight of greater than 1020 g/mol, and/or at least three of the substituents on the B atom may each have a molecular volume of greater than 250 cubic Å, e.g., greater than 300 cubic Å or greater than 500 cubic Å.

"Molecular volume" is used herein as an approximation of spatial steric bulk of a co-activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," *Journal of Chemical Education*, Vol. 71, No. 11, November 1994, pp. 962-964. Molecular volume (MV), in units of cubic Å, is calculated using the formula: $MV \approx 8.3 V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{nd}$ long period, Cs to Bi | 9 |

A list of particularly useful bulky co-activators is included, e.g., in U.S. Pat. No. 8,658,556, which is incorporated by reference herein. In some embodiments, one or more of the tNCA activators can be chosen from the co-activators described in U.S. Pat. No. 6,211,105, which is incorporated by reference herein.

I.3. Scavenger

A scavenger can be an optional additional component of a catalyst system described herein. A scavenger is a compound typically added to facilitate oligomerization or polymerization by scavenging impurities. Without meaning to limit potential impurities, it is noted that certain impurities may represent particular difficulties for addition (olefinic) polymerizations, such as Lewis bases (e.g., ethers, alcohols, carboxylates, amines, amides, and the like, as well as combinations thereof), water, oxygen, or the like, or a combination thereof. Some scavengers may also act as activators and may be referred to as co-activators. A co-activator which is not a scavenger may also be used in conjunction with an activator in order to form an active catalyst with a transition metal compound. In some embodiments, a co-activator can be pre-mixed with the transition metal compound to form an alkylated transition metal compound, also referred to as an alkylated catalyst compound. To the extent that scavengers can facilitate the polymerization catalyst compound in performing the intended catalytic function, scavengers, if used, are sometimes considered as a part of the catalyst system.

In some embodiments, particularly where impurities to be scavenged can include solvents and/or solvent impurities, useful scavengers can include, but are not necessarily limited to, an alum(on)oxane, an alkylalumoxane such as methylalumoxane, a compound represented by the formula $Al(OR)_n(R)_{3-n}$ (where n is an integer from 1 to 3, and where each R is, independently, a C1-C18 aliphatic and/or aromatic hydrocarbon group, such as a methyl, an ethyl, a propyl, a butyl, a pentyl, a hexyl, an octyl, a decyl, a dodecyl, a tetradecyl, a hexadecyl, an octadecyl, a cyclohexanyl, a cycloheptanyl, a methylcyclohexanyl, a naphthenyl, a phenyl, a benzyl, a toluyl, an indenyl, a naphthyl, or an isomer thereof), a compound represented by the formula $AlR_3$ and/or $ZnR_2$ (where each R is, independently, a C1-C18 aliphatic hydrocarbon group, such as a methyl, an ethyl, a propyl, a butyl, a pentyl, a hexyl, an octyl, a decyl, a dodecyl, a tetradecyl, a hexadecyl, an octadecyl, or an isomer thereof), or a combination thereof, e.g., diethyl zinc, methylalumoxane, trimethylaluminum, triethylaluminum, triisobutylaluminum, trihexylaluminum, trioctylaluminum, or a combination thereof. In some embodiments, the scavenger can comprise a C1-C18 trialkylaluminum compound. In a particular embodiment, the scavenger can comprise, consist essentially of, or be tri-n-octyl-aluminum (TNOAL).

Additionally or alternatively, U.S. Pat. No. 9,409,834 (e.g., at line 37, column 33 to line 61, column 34) provides detailed description of scavengers that may be useful in the process of the present invention for making polymeric products. The relevant portions of this publication, involving scavengers, their identities, quantity, and manner of use are incorporated herein in their entirety.

I.4. Chain Transfer Agent

Optionally, catalyst systems may include a chain transfer agent, e.g., to afford better control of molecular weight during the oligomerization or polymerization. In some embodiments, the activator or co-activator (or one of the activators or co-activators) can additionally function as a chain transfer agent. Additionally or alternatively, as there can be overlap between some scavengers and some chain transfer agents, in some embodiments, any scavengers present in the catalyst system may perform a function of a chain transfer agent, or vice versa. Useful chain transfer agents can include alkylalumoxanes, a compound represented by the formula $AlR_3$ and/or $ZnR_2$ (where each R is, independently, a C1-C8 aliphatic radical, such as a methyl, an ethyl, a propyl, a butyl, a pentyl, a hexyl, an octyl, or an isomer thereof), or a combination thereof, e.g., diethyl zinc, methylalumoxane, trimethylaluminum, triisobutylaluminum, trioctylaluminum, or a combination thereof.

I.5. Optional Support Material

In some embodiments, e.g., where catalyst compounds and/or activators are present predominantly (or fully) in a solid phase, the catalyst system (particularly but not limited to the activator and/or co-activator) may comprise a support material, which can advantageously be relatively inert with respect to the polymerization/oligomerization reaction. In some embodiments, the supported material can comprise or be a porous support material, e.g., talc, a zeolite, a clay, an organically modified clay, an inorganic oxide, or any other organic or inorganic support material, or a mixture thereof.

In embodiments where a support material is desired, the support material can comprise or be an inorganic oxide in a finely divided form. Suitable inorganic oxide materials can include metal oxides of groups 2, 4, 13, and/or 14, such as silica, alumina, silicates, aluminates, aluminosilicates, and mixtures thereof. Other inorganic oxides that may be employed either alone or in combination with the silicon/aluminum oxides include those of magnesium, titanium, zirconium, calcium, vanadium, yttrium, niobium, cobalt, nickel, zinc, a lanthanide, or the like, or a combination thereof. Other suitable support materials can additionally or alternatively be employed, e.g., finely divided functionalized polyolefins, such as finely divided polyethylene. Particularly useful supports include magnesia, titania, zirconia, montmorillonite, phyllosilicate, zeolites, talc, clays, and the like, as well as combinations thereof. Also, combinations of these support materials may be used, for example, silica-chromia, silica-alumina, silica-titania, and the like. In preferred embodiments, support materials can include alumina, zirconia, silica, and combinations thereof, e.g., alumina and/or silica.

If used, it can be preferred in some embodiments that the (inorganic oxide) support material have a surface area in the range from about 10 $m^2/g$ to about 700 $m^2/g$ (e.g., from about 50 $m^2/g$ to about 500 $m^2/g$ or from about 100 $m^2/g$ to about 400 $m^2/g$), a pore volume in the range from about 0.1 cc/g to about 4.0 cc/g (e.g., from about 0.5 cc/g to about 3.5 cc/g or from about 0.8 cc/g to about 3.0 cc/g), and an average particle size in the range from about 5 µm to about 500 µm (e.g., from about 10 µm to about 200 µm or from about 5 µm to about 100 µm). The average pore size of the support material can advantageously be in the range from about 10 Å to 1000 Å, e.g., from about 50 Å to about 500 Å or from about 75 Å to about 350 Å. In some embodiments, the support material can be a high surface area, amorphous silica (e.g., exhibiting a surface area of about 300 $m^2/g$ and a pore volume of about 1.65 cc/g). In some embodiments, the support material can comprise or be a silica marketed under the tradename of DAVISON 952, DAVISON 948, or DAVISON 955 by the Davison Chemical Division of W.R. Grace and Company.

When used, the support material should be dry, that is, substantially free of absorbed water. Drying of the support material can be effected, e.g., by heating or calcining at about 100° C. to about 1000° C., preferably at least about 600° C. When the support material is silica, it can be heated to at least 200° C., e.g., about 200° C. to about 850° C. or at about 600° C., for an appropriate time to drive off any adsorbed water (e.g., from about 1 minute to about 100 hours, from about 12 hours to about 72 hours, or from about 24 hours to about 60 hours). The calcined support material can typically have at least some reactive hydroxyl (OH) groups to produce supported catalyst systems. The calcined support material can then be contacted with at least one polymerization catalyst comprising at least one catalyst compound (preferably a metallocene) and an activator.

In embodiments employing suspension or slurry polymerization reactions, the support material, typically having reactive surface groups such as hydroxyl groups, can be slurried in a non-polar solvent and then contacted with a slurry or solution or emulsion containing a polymerization catalyst compound and an activator. In some embodiments, the slurry of the support material can first be contacted with the activator for a period of time from about 0.5 hours to about 24 hours, e.g., from about 2 hours to about 16 hours or from about 4 hours to about 8 hours, after which the solution of the catalyst compound can then be contacted with the isolated support/activator. In some embodiments, the supported catalyst system can be generated in situ. In alternative embodiments, the slurry of the support material may first be contacted with the polymerization catalyst compound for a period of time from about 0.5 hours to about 24 hours, e.g., from about 2 hours to about 16 hours or from about 4 hours to about 8 hours, after which slurry of the supported polymerization catalyst compound can then be contacted with the activator solution/slurry.

The mixture of the catalyst, activator, and support can be heated (or allowed to come) to a temperature of about 0° C. to about 70° C., e.g., about 15° C. to about 60° C. or at approximately room temperature. Contact times typically range from about 0.5 hours to about 24 hours, from about 2 hours to about 16 hours, or from about 4 hours to about 8 hours.

Suitable non-polar solvents can advantageously include materials in which all of the reactants used herein, i.e., at least the activator and the catalyst compound, are at least partially soluble and which are substantially liquid at reaction temperatures. In some embodiments, the non-polar solvent can comprise or be an alkane, such as isopentane, hexane, n-heptane, octane, nonane, and decane, although a variety of other materials including cycloalkanes, such as cyclohexane, aromatics, such as benzene, toluene, and ethylbenzene, may additionally or alternatively be employed.

II. Process for Making a Polymeric Product

In embodiments herein, an aspect of the invention relates to polymerization processes where monomer (such as ethylene), and optionally a comonomer, is/are contacted with a polymerization catalyst system comprising an activator, at least one polymerization catalyst compound, and optionally a scavenger, as described above. The catalyst compound and activator may be combined in any order, and are typically combined prior to contact with the monomer.

II.1. Monomer(s)

Monomers useful herein can include substituted or unsubstituted C2 to C40 alpha-olefins, preferably C2 to C20 alpha olefins, such as C2 to C12 alpha olefins, e.g., ethylene, propylene, butene, pentene, hexene, heptene, octene, nonene, decene, undecene, dodecene, isomers thereof, and mixtures thereof. In preferred embodiments, the monomer comprises ethylene. In preferred embodiments, the monomer comprises ethylene and an optional comonomer comprising one or more C3 to C40 olefins, such as one or more C3 to C20 olefins or one or more C6 to C12 olefins. The optional C3 to C40 olefin comonomers may be linear, branched, or cyclic. In some embodiments, the monomer comprises propylene and an optional comonomer comprising ethylene and/or one or more C3 to C40 olefins, such as ethylene and/or one or more C3 to C20 olefins or ethylene and/or one or more C6 to C12 olefins. If cyclic in any set of embodiments, the olefin (co)monomers may be strained or unstrained, monocyclic or polycyclic, and may optionally include heteroatoms and/or one or more functional groups.

Exemplary C2 to C40 olefin monomers and optional comonomers can include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, isomers thereof, and combinations thereof, preferably including at least ethylene and optionally one or more of hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives.

In some embodiments, one or more dienes may be present as a comonomer (and thus its polymerized version in the polymer produced) at up to 10 wt %, e.g., from 100 wppb to 1.0 wt %, from 20 wppm to 5000 wppm, or from 30 wppm to 2000 wppm, based upon the total weight of the composition. In some embodiments, 500 wppm or less of diene is added to the polymerization feed, e.g., 400 wppm or less or 300 wppm or less; additionally or alternatively, at least 50 wppm of diene is added to the polymerization feed, e.g., 100 wppm or more or 150 wppm or more. If present, diolefin monomers useful in this invention can include any hydrocarbon structure, preferably C4 to C30, having at least two unsaturated bonds (typically, but not necessarily, conjugated), wherein at least two of the unsaturated bonds are readily polymerizable by either a stereospecific or a non-stereospecific catalyst(s). If present, it is preferred that diolefin monomers comprise or are alpha,omega-diene monomers (di-vinyl monomers), such as linear di-vinyl monomers, examples of which can include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and combinations thereof. If present, particularly preferred dienes can include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, low molecular weight polybutadienes (Mw less than 1000 g/mol), cyclopentadiene, vinylnorbornene, norbornadiene, ethylidene norbornene, divinylbenzene, dicyclopentadiene and combinations thereof.

In some preferred embodiments, at least a portion (e.g., at least 80 mol %, at least 85 mol %, at least 90 mol %, at least 95 mol %, at least 96 mol %, at least 98 mol %, at least 99%, at least 99.5 mol %, or completely all, allowing for some impurities present in feed components) of the alpha-olefins present in the feed are linear alpha-olefins (LAOs), i.e., those without a branch attached to the carbon backbone thereof. Non-limiting examples of LAOs are ethylene, 1-propene, 1-butene, 1-pentene, 1-hexene, 1-heptene, 1-octene, 1-nonene, 1-decene, 1-dodecene, 1-tetradecene, 1-hexadecene, 1-octadecene, 1-icocene, C22, C24, C26, C28, and C30 LAOs. Without being bound by theory, polymeric or oligomeric products made from such LAOs by using the process of the present disclosure can tend to have fewer branches and pendant groups, leading to generally more uniform product molecular structures, and hence typically better performance for certain applications, such as lubricant base stocks, lubricant additives, and the like. Desirably, at least one of the alpha-olefins in the mixture feed can be an LAO. In particular, substantially all of the alpha-olefins in the mixture feed can be LAOs.

In some preferred embodiments, the alpha-olefins present in the feed are comprised of at least a first content (e.g., more than 50 mol %, at least 55 mol %, at least 60 mol %, at least 65 mol %, at least 70 mol %, at least 75 mol %, at least 80 mol %, at least 85 mol %, at least 90 mol %, or at least 95 mol %) of ethylene (C2 alpha-olefins), optionally with a remainder content of C3 to C40 alpha-olefins present in the feed. In most such embodiments, the remainder content plus the first content sums to 100%. In additional or alternative embodiments, ethylene (C2 alpha-olefins) may not be the only alpha-olefin present in the feed, such that the first content may be, e.g., 99.9 mol % or less, 99 mol % or less, 97 mol % or less, 95 mol % or less, 93 mol % or less, 90 mol % or less, 85 mol % or less, 80 mol % or less, 75 mol % or less, 70 mol % or less, 65 mol % or less, or 60 mol % or less, relative to a total content of alpha-olefins in the feed. In some embodiments where the remainder content of C3 to C40 alpha-olefins is non-zero, at least a portion (e.g., at least 40 mol %, more than 50 mol %, at least 55 mol %, at least 60 mol %, at least 65 mol %, at least 70 mol %, at least 75 mol %, at least 80 mol %, at least 85 mol %, at least 90 mol %, at least 95 mol %, at least 96 mol %, at least 98 mol %, at least 99%, at least 99.5 mol %, at least 99.9 mol %, or completely all, allowing for some impurities present in feed components) of the alpha-olefins present in the feed are C6-C18 or C6-C12 linear alpha-olefins, relative to a total content of C3 to C40 alpha-olefins in the feed. In particular embodiments, the first content can be from 70 mol % to 95 mol % and the remainder content can be from 5 mol % to 30 mol %.

The catalyst compositions can be used individually or can be mixed with other known polymerization catalysts to prepare polymer or oligomer blends. Monomer and catalyst selection can allow polymer or oligomer blend preparation under conditions analogous to those using individual catalysts. Polymers having increased PDI are typically available from polymers made with mixed catalyst systems. Mixed catalyst can comprise two or more polymerization catalyst compounds and/or two or more activators.

The alpha-olefins used herein can optionally be produced directly from ethylene growth process as practiced by several commercial production processes, or they can be produced from Fischer-Tropsch hydrocarbon synthesis from $CO/H_2$ syngas, from metathesis of internal olefins with ethylene, from cracking of petroleum or Fischer-Tropsch synthetic wax at high temperature, or from any other alpha-olefin synthesis routes. An exemplary feed for this invention can be at least 80 wt % alpha-olefin (preferably linear alpha olefin), preferably at least 90 wt % alpha-olefin (preferably linear alpha olefin), or approximately 100% alpha-olefin (preferably linear alpha olefin). However, alpha-olefin mixtures can also be used as feeds, especially if the other components are internal-olefins, branched olefins, paraffins, cyclic paraffins, aromatics (such as toluene and or xylenes). These components may have diluent effects and are believed to not have a substantial detrimental effect on the polymerization of alpha-olefins. In other words, the process described herein can selectively convert alpha-olefins in a mixture and leave the other components largely, if not completely, unreacted. This technology can be used to separate out alpha-olefins from a mixture by selectively reacting them with polymerization or oligomerization catalyst systems, effectively if not completely eliminating the need to separate alpha-olefins from the remainder of the components in a mixed feed stream. This can be economically advantageous, for example, in a process utilizing Fisher-Tropsch synthesis olefin product streams containing alpha-olefins, internal-olefins, and branched olefins. Such a mixture can be fed to oligomerization technology as described herein and to selectively react away the alpha-olefin. No separate step to isolate the alpha-olefin may be needed. Another example of the utility of this process involves alpha-olefins produced by the metathesis of internal olefins with ethylene, which may contain some internal olefins. This mixed olefin base stock feed can be reacted as-is in the polymerization/oligomerization process of the present invention, which selectively converts the alpha-olefins into lube products. Thus, one can use the alpha-olefin for the base stock synthesis without having to separate the alpha-olefin from internal olefin. This can bring a significant improvement in process economics.

II.2. Feed Purification

Olefinic feed and/or solvents may be treated to remove catalyst poisons, such as peroxides, oxygen or nitrogen-containing organic compounds or acetylenic compounds before being supplied to the polymerization reactor. For example, the treatment of the linear alpha-olefin with an activated 13 Å molecular sieve and a de-oxygenate catalyst (i.e., a reduced copper catalyst) can increase catalyst productivity (expressed in terms of quantity of polymeric/oligomeric product produced per micromole of the polymerization catalyst compound used) more than 10-fold. Alternatively, the feed olefins and/or solvents may be treated with an activated molecular sieve, such as 3 Å, 4 Å, 8 Å, or 13 Å molecular sieve, and/or in combination with an activated alumina or an activated de-oxygenate catalyst. Such treatment can desirably increase catalyst productivity 2- to 10-fold or more.

II.3. Polymerization Reaction

Polymerization processes of this invention can be carried out in any manner known in the art. Although any suspension, homogeneous, bulk, solution, slurry, or gas phase polymerization process known in the art can be used, for some embodiments, it can be preferred to utilize solution, homogeneous, or bulk polymerization processes (in particular, solution polymerization processes). Such processes can be run in a batch, semi-batch, or continuous mode. In some embodiments, a homogeneous polymerization process or a slurry polymerization process can be used. A homogeneous polymerization process is preferably a process where at least 90 wt % of the product is soluble in the reaction medium. In some embodiments, a bulk homogeneous process can be used. In a bulk process, monomer concentration in all feeds to the reactor is typically 70 vol % or more. In some embodiments, no solvent or diluent is present in, or intentionally added to, the reaction medium (e.g., except for the small amounts used as the carrier for the catalyst system or other additives, or amounts typically found with the monomer; e.g., ethane in ethylene). In a slurry polymerization process, a relatively insoluble (e.g., solid-supported) catalyst is employed and liquid (or gaseous) monomers are polymerized at the (liquid-solid and/or gas-solid) phase interface. In some slurry processes, at least 95 wt % of polymer products derived from the supported catalyst are in granular form as solid particles (i.e., not dissolved in the diluent).

Suitable diluents/solvents for polymerization can include non-coordinating (typically, relatively inert) liquids. Examples can include: straight and branched-chain C3 to C20 hydrocarbons, such as propane, isobutane, butane, pentane, isopentane, hexanes, isohexane, heptane, octane, nonane, decane, dodecane, hexadecane, icosane, and mixtures thereof; cyclic and alicyclic hydrocarbons, such as cyclohexane, cycloheptane, methylcyclohexane, methylcycloheptane, and mixtures thereof, such as can be found commercially (e.g., Isopar™); perhalogenated hydrocarbons, such as perfluorinated C4 to C10 alkanes, chlorobenzene; aromatic and alkyl substituted aromatic compounds, such as benzene, toluene, mesitylene, and xylenes such as o-xylene, m-xylene, and p-xylene; and combinations thereof. Additional or alternative solvents can include liquid olefins that may act as monomers or comonomers, such as ethylene, propylene, 1-butene, 1-hexene, 1-pentene, 3-methyl-1-pentene, 4-methyl-1-pentene, 1-octene, 1-decene, 1-dodecene, and mixtures thereof. In a preferred embodiment, an aliphatic or cyclic hydrocarbon solvent can be used as a solvent, such as isobutane, butane, pentane, isopentane, hexane, isohexane, heptane, octane, nonane, decane, dodecane, hexadecane, icosane, cyclohexane, cycloheptane, methylcyclohexane, methylcycloheptane, or a mixture thereof. In some embodiments, the solvent is not aromatic, with aromatics being present in the solvent at less than 1 wt %, preferably less than 0.5 wt % or less than 0.1 wt %, based upon the total weight of all solvents.

In some preferred embodiments, the polymerization can be a solution polymerization with a solvent comprising isobutane, butane, pentane, isopentane, hexanes, isohexane, heptane, octane, dodecane, cyclohexane, cycloheptane, methylcyclohexane, methylcycloheptane, a perfluorinated C4 to C10 alkane, chlorobenzene, benzene, toluene, mesitylene, xylene, or a combination thereof. In some preferred embodiments, the inventive activator is at least partially soluble in the solvent at polymerization conditions.

In some embodiments, the feed concentration of the monomers and comonomers for the polymerization is 60 vol % solvent or less, e.g., 40 vol % or less or 20 vol % or less, based on the total volume of the feedstream. In some embodiments, the polymerization process is a bulk polymerization process.

When a solid supported catalyst is used for the conversion, a slurry polymerization/oligomerization process generally operates in the similar temperature, pressure and residence time range as described previously. In a slurry polymerization or oligomerization, a suspension of solid catalyst, promoters, monomer, and comonomers are added. The suspension including diluent is intermittently or continuously removed from the reactor. The catalyst is then separated from the product by filtration, centrifuge or settlement. The fluid is then distilled to remove solvent, any unreacted components and light product. A portion or all of the solvent and unreacted component or light components can be recycled for reuse.

If the catalyst used is un-supported or is a solution catalyst, when the reaction is complete or when the product is withdrawn from the reactor (such as in a continuous stirred tank reactor), the product may still contain soluble, suspended, or mixed catalyst system components. These components can preferably be deactivated and/or removed. Any of the usual catalyst deactivation methods or aqueous wash methods can be used to remove the catalyst system component(s). Typically, the reaction can be deactivated by addition of stoichiometric amount or excess of air, moisture, alcohol, isopropanol, etc. The mixture can then be washed with dilute sodium hydroxide or with water to remove catalyst system components. The residual organic layer may then be subjected to distillation to remove solvent, which can optionally be recycled for reuse. The distillation can further remove any light reaction product, e.g., from C18 and less.

Preferred polymerizations can be run at any temperature and/or pressure suitable to obtain the desired ethylene (co)polymers. Typical temperatures and/or pressures can include: a temperature in the range of from about 0° C. to about 300° C., e.g., from about 20° C. to about 200° C., from about 35° C. to about 150° C., from about 40° C. to about 120° C., or from about 45° C. to about 95° C.; and at a pressure in the range of from about 0.35 MPa to about 10 MPa, e.g., from about 0.45 MPa to about 6 MPa or from about 0.5 MPa to about 4 MPa. In a typical polymerization, the run time of the reaction can be up to 300 minutes, e.g., from about 5 minutes to about 250 minutes or from about 10 minutes to about 120 minutes.

In some embodiments, hydrogen can be present in the polymerization reactor, e.g., at a partial pressure of about 0.001 psig to about 50 psig (~7 Pag to ~350 kPag), from about 0.01 psig to about 25 psig (~70 Pag to ~170 kPag), or from about 0.1 psig to about 10 psig (~0.7 kPag to ~70 kPag).

In certain embodiments, the activity of the catalyst can be at least 50 g/mmol/hour, e.g., 500 g/mmol/hour or more, 5 kg/mmol/hr or more, or 50 kg/mmol/hr or more. Additionally or alternatively, the conversion (yield) of olefin monomer (to polymeric or oligomeric product) can be at least 10%, based upon the weight of the monomer entering the reaction zone, e.g., 20% or more, 30% or more, 50% or more, or 80% or more.

In some embodiments, little or no scavenger is used in the process to produce the olefin (co)polymer. For example, a metal-containing scavenger (such as a trialkylaluminum) can be present at about 0 mol %, or alternatively at a molar ratio of scavenger metal to transition metal (M) of less than 100:1, e.g., less than 50:1, less than 15:1, or less than 10:1.

In some preferred embodiments, at least one (e.g., at least two, at least three, at least four, at least five, at least six, or all seven) of the following characterizations is(are) true regarding the polymerization process: 1) the polymerization is conducted at temperatures of 0 to 300° C. (e.g., 25 to 150° C., 40 to 120° C., or 45 to 95° C.); 2) the polymerization is conducted at a pressure from atmospheric pressure (0 MPag) to 10 MPag (e.g., from 0.35 MPag to 10 MPag, from 0.45 MPag to 6 MPag, or from 0.5 MPag to 4 MPag); 3) the polymerization is conducted in an cyclic and/or aliphatic hydrocarbon solvent (such as isobutane, butane, pentane, isopentane, hexanes, isohexane, heptane, octane, nonane, decane, dodecane, cyclohexane, cycloheptane, methylcyclohexane, methylcycloheptane, or a mixture thereof, preferably with aromatics being present in the solvent at less than 1 wt %, e.g., less than 0.5 wt % or less than 0.1 wt %, based upon the weight of the solvents); 4) the polymerization occurs in one reaction zone; 5) the productivity of the catalyst compound is at least 5 kg/mmol/hr (e.g., at least 50 kg/mmol/hr, at least 80 kg/mmol/hr, at least 100 kg/mmol/hr, at least 200 kg/mmol/hr, or at least 250 kg/mmol/hr); 6) metal-containing scavengers (such as trialkyl aluminum compounds) are absent (e.g., present at about 0 mol %) or are present at a molar ratio of scavenger metal to transition metal of less than 100:1 (e.g., less than 50:1, less than 15:1, or less than 10:1); and 7) hydrogen is present in the polymerization reactor at a partial pressure about 0.001 psig to about 50 psig (~7 Pag to ~350 kPag) (e.g., from about 0.01 psig to about 25 psig (~70 Pag to ~170 kPag), or from about 0.1 psig to about 10 psig (~0.7 kPag to ~70 kPag)). In some preferred embodiments, at least the first five of the aforementioned characterizations are true regarding the polymerization process. In some embodiments, the catalyst system used in the polymerization comprises no more than one polymerization catalyst compound. A "reaction zone," also referred to as a "polymerization zone," is any vessel in which polymerization takes place, for example a batch reactor. When multiple reactors are used in either series or parallel configuration, each reactor is considered as a separate reaction/polymerization zone. For a multi-stage polymerization in both batch and continuous reactors, each polymerization stage is considered as a separate reaction/polymerization zone.

Other additives may optionally be used in the polymerization, as desired, such as one or more scavengers, promoters, modifiers, chain transfer agents, reducing agents, oxidizing agents, hydrogen, aluminum alkyls, silanes, or the like, or combinations thereof. In certain embodiments, particularly where impurities to be scavenged can include solvents and/or solvent impurities, it can be particularly advantageous for a scavenger to be present.

The polymerization reaction mixture can then be quenched, e.g., by the addition of a quenching agent such as water, $CO_2$, methanol, ethanol, mixtures thereof, and the like. Subsequently, the polymerization reaction mixture can be separated to remove the residual monomer, which can be recycled, e.g., to the polymerization reactor. Monomer removal can be carried out by means such as flashing under vacuum, distillation, or extraction.

III. Polymerization Products

The present invention further provides compositions of matter, which can be produced by the methods and/or processes described herein.

In a preferred embodiment, the process described herein produces ethylene homopolymers or ethylene copolymers, such as ethylene-alpha-olefin (preferably $C_3$ to $C_{20}$) copolymers (such as ethylene-butene copolymers, ethylene-hexene, ethylene-octene, and/or ethylene-decene copolymers) having an Mw/Mn of greater than 1 to 40 (e.g., greater than 1 to 4.0, greater than 1 to about 3.5, or greater than 1 to about 3.0).

Likewise, processes of the present invention can form ethylene copolymers. In a preferred embodiment, the copolymers produced herein can have from 0 mol % to 35 mol % (e.g., from 0.1 mol % to 30 mol %, from 0.3 mol % to 35 mol %, from 5 mol % to 30 mol %, from 0.5 mol % to 20 mol %, from 1 mol % to 15 mol %, or from 3 mol % to 10 mol %) of one or more C3 to C40 olefin comonomers, such as a C3-C40 alpha-olefin, a C3-C30 alpha-olefin, a C3-C20 alpha-olefin, a C6-C18 alpha-olefin, a C3-C12 alpha-olefin, or a C6-C12 alpha-olefin (preferably including one or more of propylene, butene, hexene, octene, decene, and dodecene).

In some embodiments, the monomer is ethylene and the comonomer is hexene, e.g., from 5 mol % to 30 mol %, from 1 mol % to 15 mol %, or from 1 mol % to 10 mol %. In some embodiments, the monomer is ethylene and the comonomer is octene, e.g., from 5 mol % to 30 mol %, from 1 mol % to 15 mol %, or from 1 mol % to 10 mol %. In some embodiments, the monomer is ethylene and the comonomer is decene, e.g., from 5 mol % to 30 mol %, from 1 mol % to 15 mol %, or from 1 mol % to 10 mol %.

In advantageous embodiments, a polymer product according to the invention may be made from an alpha-olefin feed comprising ethylene (C2) monomer and optionally a C3 to C40 alpha-olefin comonomer. In such advantageous embodiments, in some cases as a result of the polymerization processes described herein and/or of the polymerization catalysts/catalyst systems described herein, the polymer product can exhibit one or more (e.g., two or more, three or more, four or more, or all five) of the following, as measured by GPC: a polydispersity index from greater than 1 to 15 (e.g., from greater than 1 to 13, from greater than 1 to 11, from greater than 1 to 10, from greater than 1 to 9.0, from greater than 1 to 8.0, from greater than 1 to 7.0, from greater than 1 to 6.5, from greater than 1 to 6.0, from greater than 1 to 5.5, from greater than 1 to 5.0, from greater than 1 to 4.5, from greater than 1 to 4.0, from greater than 1 to 3.7, from greater than 1 to 3.5, from greater than 1 to 3.2, from greater than 1 to 3.0, from 1.3 to 15, from 1.3 to 13, from 1.3 to 11, from 1.3 to 10, from 1.3 to 9.0, from 1.3 to 8.0, from 1.3 to 7.0, from 1.3 to 6.5, from 1.3 to 6.0, from 1.3 to 5.5, from 1.3 to 5.0, from 1.3 to 4.5, from 1.3 to 4.0, from 1.3 to 3.7, from 1.3 to 3.5, from 1.3 to 3.2, from 1.3 to 3.0, from 1.5 to 15, from 1.5 to 13, from 1.5 to 11, from 1.5 to 10, from 1.5 to 9.0, from 1.3 to 8.0, from 1.5 to 7.0, from 1.5 to 6.5, from 1.5 to 6.0, from 1.5 to 5.5, from 1.5 to 5.0, from 1.3 to 4.5, from 1.5 to 4.0, from 1.5 to 3.7, from 1.5 to 3.5, from 1.5 to 3.2, from 1.5 to 3.0, from 1.7 to 15, from 1.7 to 13, from 1.7 to 11, from 1.7 to 10, from 1.7 to 9.0, from 1.3 to 8.0, from 1.7 to 7.0, from 1.7 to 6.5, from 1.7 to 6.0, from 1.7 to 5.5, from 1.7 to 5.0, from 1.3 to 4.5, from 1.7 to 4.0, from 1.7 to 3.7, from 1.7 to 3.5, from 1.7 to 3.2, from 1.7 to 3.0, from 2.0 to 15, from 2.0 to 13, from 2.0 to 11, from 2.0 to 10, from 2.0 to 9.0, from 2.0 to 8.0, from 2.0 to 7.0, from 2.0 to 6.5, from 2.0 to 6.0, from 2.0 to 5.5, from 2.0 to 5.0, from 2.0 to 4.5, from 2.0 to 4.0, from 2.0 to 3.7, from 2.0 to 3.5, from 2.0 to 3.2, from 2.0 to 3.0, from 2.3 to 15, from 2.3 to 13, from 2.3 to 11, from 2.3 to 10, from 2.3 to 9.0, from 2.3 to 8.0, from 2.3 to 7.0, from 2.3 to 6.5, from 2.3 to 6.0, from 2.3 to 5.5, from 2.3 to 5.0, from 2.3 to 4.5, from 2.3 to 4.0, from 2.3 to 3.7, from 2.3 to 3.5, from 2.3 to 3.2, from 2.3 to 3.0, from 2.5 to 15, from 2.5 to 13, from 2.5 to 11, from 2.5 to 10, from 2.5 to 9.0, from 2.5 to 8.0, from 2.5 to 7.0, from 2.5 to 6.5, from 2.5 to 6.0, from 2.5 to 5.5, from 2.5 to 5.0, from 2.5 to 4.5, from 2.5 to 4.0, from 2.5 to 3.7, from 2.5 to 3.5, from 2.5 to 3.2, or from 2.5 to 3.0); a number average molecular weight (Mn) of at least 500 g/mol (e.g., at least 600 g/mol, at least 700 g/mol, at least 800 g/mol, at least 1000 g/mol, at least 1500 g/mol, at least 2000 g/mol, or at least 2500 g/mol; additionally or alternatively up to 3000000 g/mol, up to 2500000 g/mol, up to 2000000 g/mol, up to 1500000 g/mol, or up to 1000000 g/mol); and a weight average molecular weight (Mw) of at least 1000 g/mol (e.g., at least 1500 g/mol, at least 2000 g/mol, at least 2500 g/mol, at least 3000 g/mol, at least 3500 g/mol, at least 5000 g/mol, or at least 7500 g/mol; additionally or alternatively up to 10000000 g/mol, up to 8000000 g/mol, up to 7000000 g/mol, up to 6000000 g/mol, or up to 5000000 g/mol).

In some embodiments, the polymer product can have a unimodal or multimodal molecular weight distribution as determined by Gel Permeation Chromatography (GPC). By "unimodal" is meant that the GPC trace has one peak or two inflection points. By "multimodal" is meant that the GPC trace has at least two peaks or more than 2 inflection points. An inflection point is that point where the second derivative of the curve changes in sign (e.g., from negative to positive or vice versa). In some embodiments, the polymer product can have a bimodal molecular weight distribution, as determined by Gel Permeation Chromatography (GPC), in which the GPC trace has two peaks or at least 4 inflection points.

The present disclosure can be further illustrated by the following non-limiting examples.

EXAMPLES

Example 1

Synthesis of Potassium Anthracide

In Example 1, anthracene (1.29 g, 7.24 mmol) was added slowly, over a time period of about 5 minutes, to a tetrahydrofuran (THF) suspension (~100 mL) containing potassium (0.283 g, 7.24 mmol, 1 equiv). The reaction mixture quickly appeared to turn a magenta color, and then later dark blue. To push toward complete reaction, the reaction mixture was stirred for about 24 hours. The resulting reaction mixture was filtered through Celite™ (~20 g) and concentrated to a dark blue solid product under reduced pressure (100 mTorr). The solid residue was then suspended in pentane (30 mL) and filtered. The filter cake was washed with additional pentane (3×50 mL) thoroughly to remove any unreacted anthracene. The material was then dried under reduced pressure (100 mTorr) for 1 h. Yield: 1.574 g, 7.24 mmol, >98%.

Example 2

Synthesis of Potassium Cobalt Tetrakis(Perfluorophosphine) [KCo(PF$_3$)$_4$]

In Example 2, cobalt bromide (CoBr$_2$; 0.451 g, 2.062 mmol) was dissolved in THF (~50 mL) and allowed to stir for 1 hour to yield a bright blue colored solution, which was then cooled to about −78° C. In a separate container, solid potassium anthracide (1.57 g, 7.216 mmol. 3.5 equiv), as prepared in Example 1, was dissolved in ~50 mL of THF over the course of ~2 min and also cooled to about −78° C. The entire cooled potassium anthracide solution was added to a Parr reactor, and then the cooled solution cobalt bromide was slowly pipetted into the Parr reactor, at which point the mixture appeared to turn a deep red color. The mixture, containing potassium cobalt anthracide, was allowed to react at −78° C. for about 1 hour before being sealed. Thereafter, gaseous perfluorophosphine (PF$_3$) was introduced at about 50 psig to the sealed reactor. The pressure was observed to rapidly drop as the PF$_3$ was cooled and consumed; additional PF$_3$ was supplied as makeup gas to sustain a pressure of 50 psig. After about 1 hour, the reactor contents were allowed to warm to approximately room temperature, and the excess PF$_3$ was purged from the reaction vessel with nitrogen and neutralized. The reactor contents were the filtered through a medium porosity (10-15 µm) glass fritted funnel to remove KBr and other insolubles. The filtrate was then concentrated under reduced pressure (100 mTorr) to form a solid residue having an apparent brownish color. The solid residue was suspended in pentane (~100 mL) and then filtered. The precipitate, containing the cobalt tetrakis(perfluorophosphine) anion, was washed thrice with additional pentane (~50 mL each) and then extracted thrice with diethyl ether (~30 mL each). The diethyl ether filtrate, again containing cobalt tetrakis(perfluorophosphine), was concentrated under reduced pressure (100 mTorr) to form a solid, which was then placed in a sublimation apparatus for heating to about 150° C. under vacuum (~100 mTorr) for about 24 hours, for two cycles, to remove as much as possible of any anthracene by-product. The sublimated product was then rinsed with pentane (3×30 mL) and dried, and then a sample was taken for NMR spectroscopic analysis.

Figure 2:
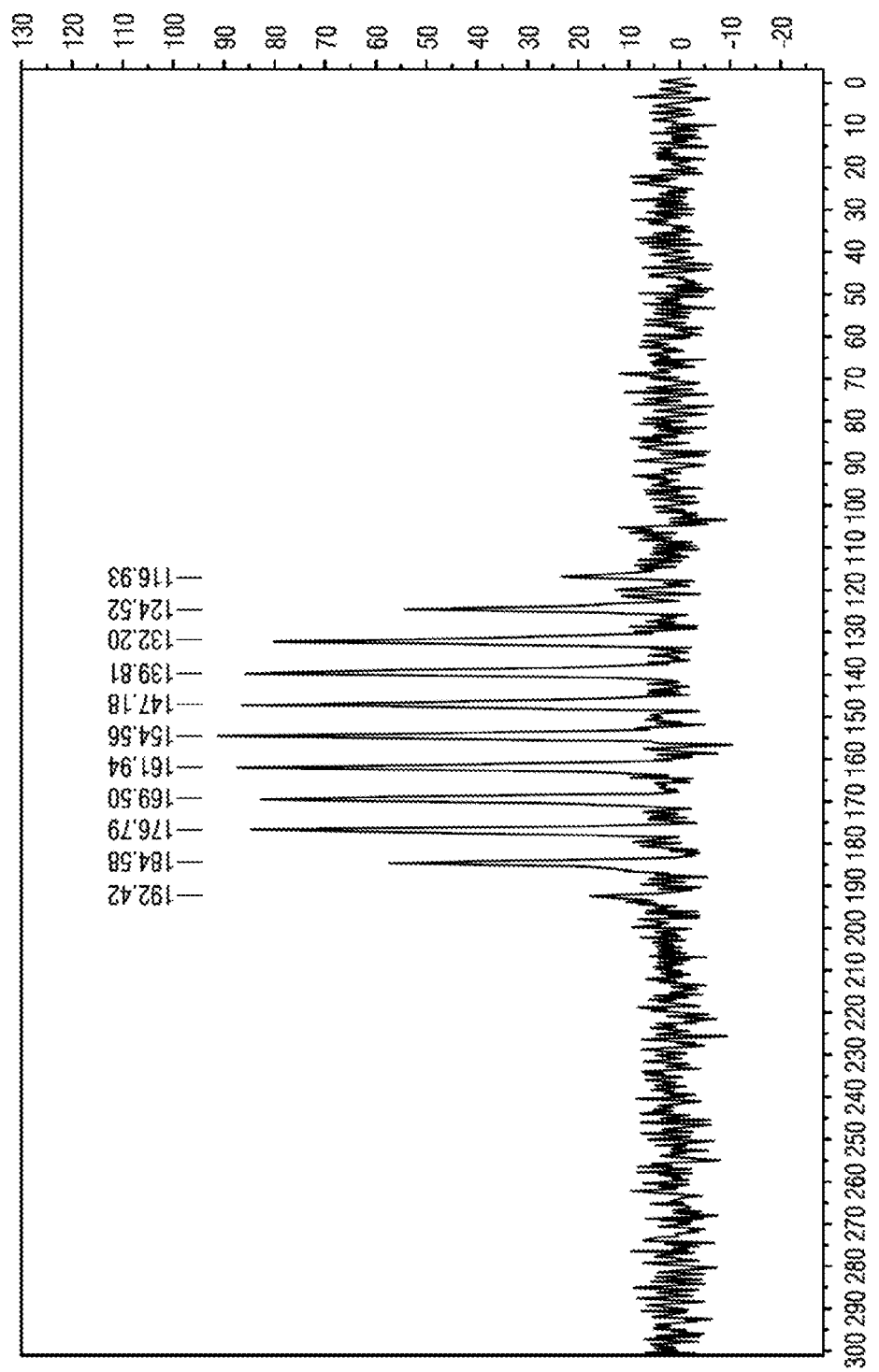
FIG. 2 shows a $^{31}$P NMR spectrum of the activator of Example 2 in THF-d8.

FIGS. 1-2 show a $^{19}$F NMR spectrum and a $^{31}$P NMR spectrum, respectively, of the rinsed sublimated product in THF-d8. The unique peaks in both spectra collectively confirmed that the rinsed sublimated product was potassium cobalt tetrakis(perfluorophosphine). Similar NMR spectroscopy identification of potassium cobalt tetrakis(perfluorophosphine) can be found in the article by J. E. Ellis, *Inorg. Chem.* 45(2006), 3167-86.

Example 3

Synthesis of Hydrogen Cobalt Tetrakis(Perfluorophosphine) [HCo(PF$_3$)$_4$]

In Example 3, the potassium cobalt tetrakis(perfluorophosphine) (0.030 g, 0.066 mmol) of Example 2 was dissolved in toluene (~4 mL) over the course of 5 min. To that solution, several microliters at a time of HCl solution in diethyl ether (2.0 M, 26.7 µL, 0.053 mmol) were added at room temperature. The resulting mixture was stirred for about 20 minutes, filtered through a glass filter pad (Whatman™, Binder-Free Glass Microfiber), and the resulting filtrate product was used as obtained.

Figure 3:
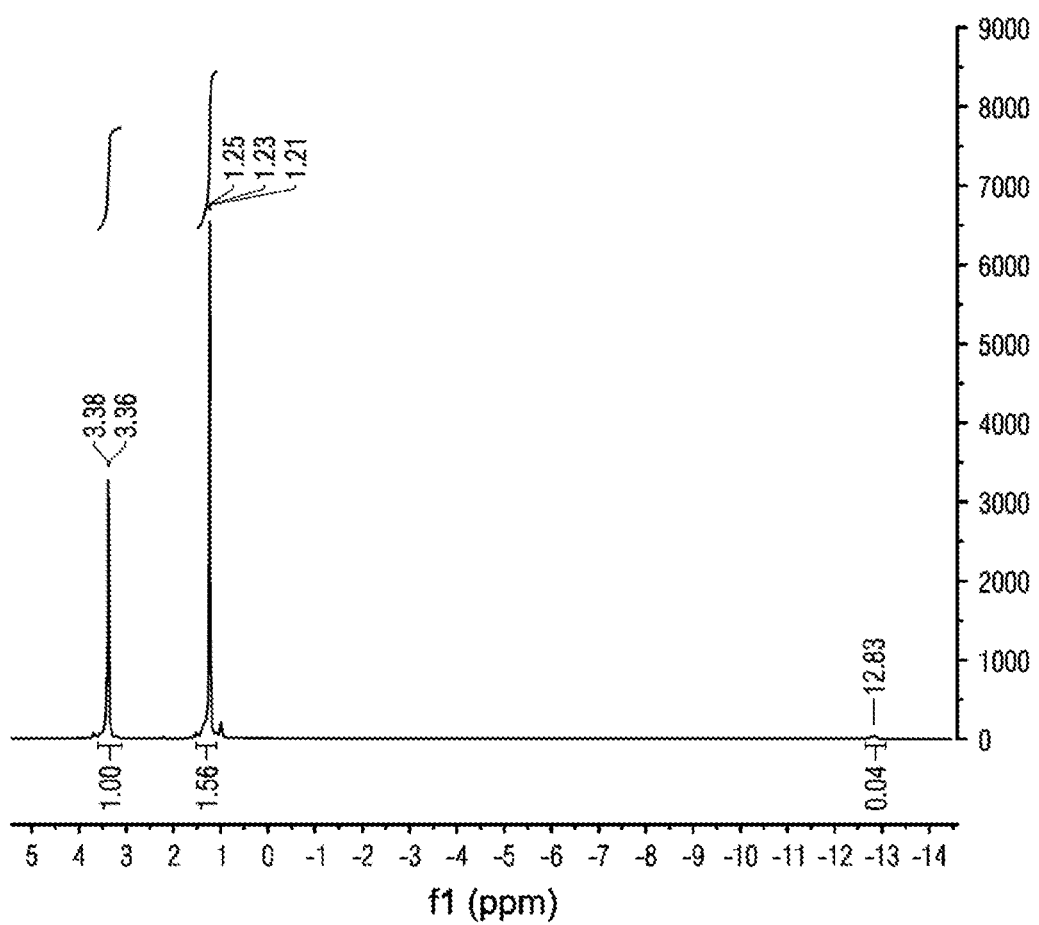
FIG. 3 shows a $^{1}$H NMR spectrum of the activator of Example 3 in benzene-d6.
Figure 4:
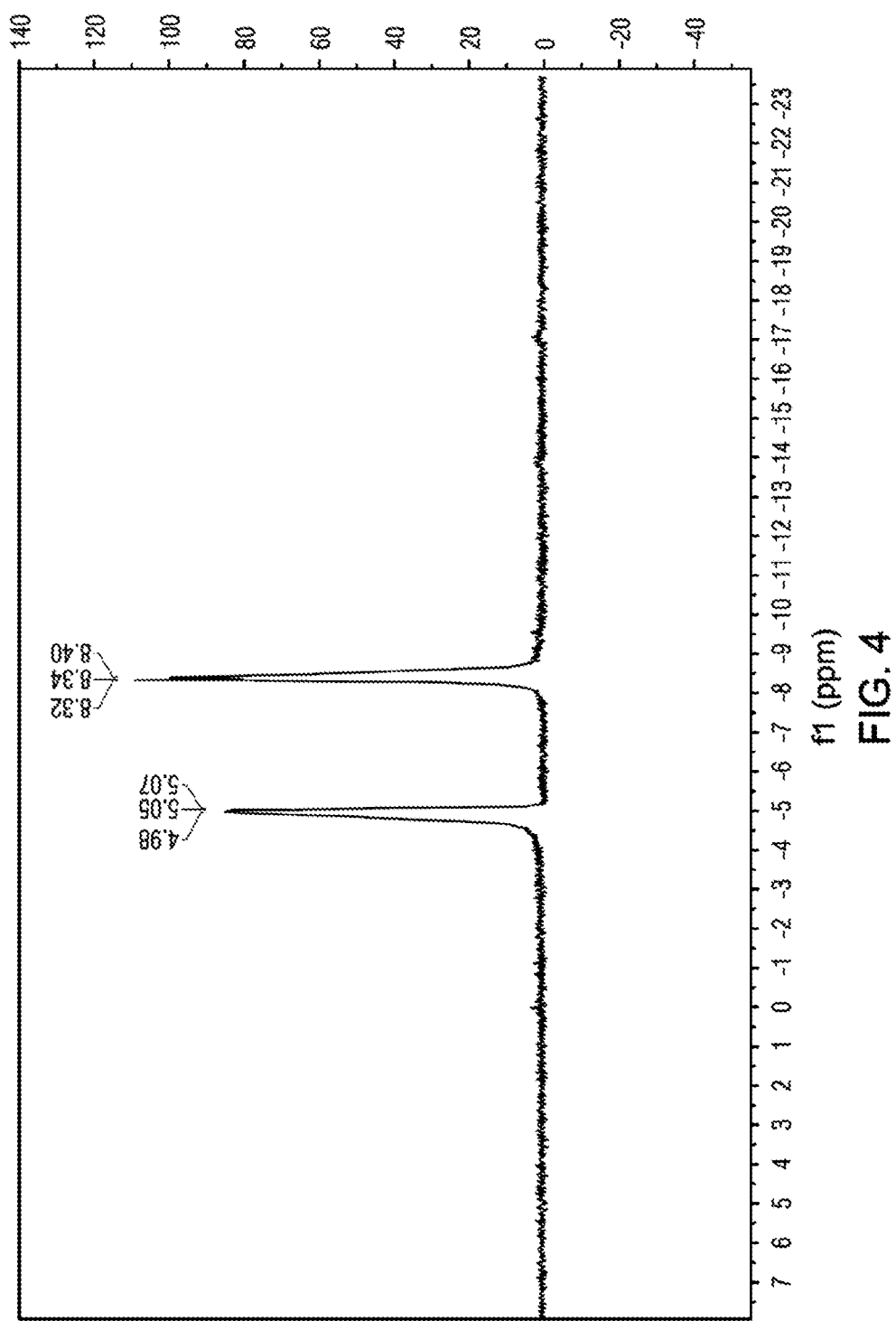
FIG. 4 shows a $^{19}$F NMR spectrum of the activator of Example 3 in benzene-d6.
Figure 5:
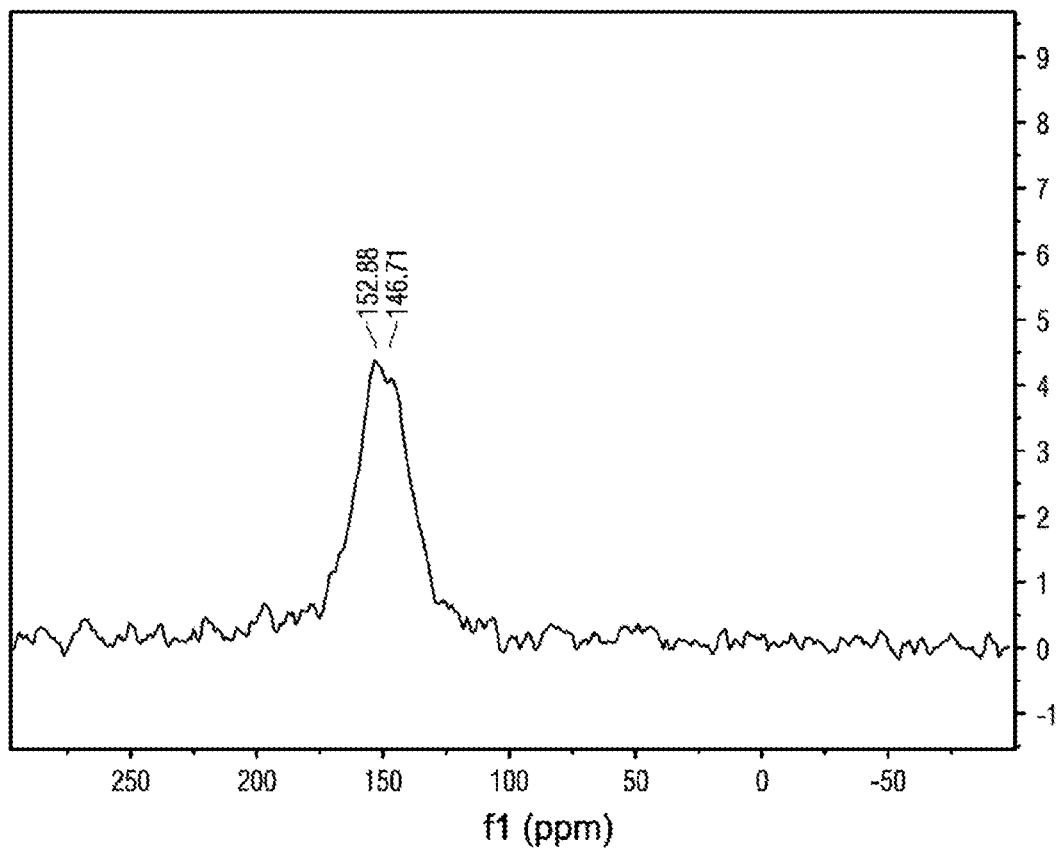
FIG. 5 shows a $^{31}$P NMR spectrum of the activator of Example 3 in benzene-d6.

Using similar procedures on the same scale, HCo(PF$_3$)$_4$ was also prepared in benzene-d6, instead of toluene, in order to enable NMR spectroscopy to confirm the conversion from potassium to hydrogen cobalt tetrakis(perfluorophosphine). FIGS. 3-5 show a $^1$H NMR spectrum, a $^{19}$F NMR spectrum, and a $^{31}$P NMR spectrum, respectively, of the small-scale product in benzene-d6. In FIG. 3, the $^1$H NMR spectrum shows a peak at about −12.9 ppm consistent with other penta-coordinated cobalt compounds containing a Co—H bond. See, e.g., A. E. Carpenter et al., *Organometallics*, 35(2016), 2309-18; and A. E. Carpenter et al., *Organometallics*, 35(2016), 2319-26. Integration of the peak area of that peak centered at about −12.9 ppm and the peaks centered at about 1.2 ppm and about 3.4 ppm, indicating diethyl ether impurity, indicate approximately a 6:1 molar ratio of diethyl ether to hydrogen cobalt tetrakis(perfluorophosphine) in the small-scale product. FIG. 4 shows similar $^{19}$F NMR peaks as seen in FIG. 1 (for potassium cobalt tetrakis(perfluorophosphine)), though shifted slightly downfield from about −4.1 ppm and about −7.5 ppm to about −5.0 ppm and about −8.3 ppm, presumably due, in part, to the change in deuterated solvent. FIG. 5, however, shows considerable broadening in the complex peak centered at about −149 ppm in the $^{31}$P NMR spectrum, as compared with FIG. 2 (for potassium cobalt tetrakis(perfluorophosphine)), with concomitant loss of $J_{P-Co}$ coupling resolution, but that is also believed to be consistent with other fluxional five-coordinate cobalt compounds containing a Co—H bond.

Example 4

Synthesis of Dimethylanilinium Cobalt Tetrakis (Perfluorophosphine) [DMAH][Co(PF$_3$)$_4$]

In Example 4, the potassium cobalt tetrakis(perfluorophosphine) (0.042 g, 0.094 mmol) of Example 2 was dissolved at room temperature in toluene (~2 mL). That solution was combined with a toluene (~2 mL) solution of dimethylanilinium chloride (0.015 g, 0.094 mmol, 1 equiv) at room temperature. The resulting mixture of solutions was stirred for about 1 hours. The solution mixture was then combined with Et$_2$O (4 mL) filtered through Celite™, and the resulting filtrate was concentrated to a solid product under reduced pressure (~100 mTorr) and used as obtained.

Using similar procedures on the same scale, [DMAH][Co(PF$_3$)$_4$] was also prepared in THF-d8, instead of toluene, to allow for spectroscopic confirmation the presence of [DMAH][Co(PF$_3$)$_4$] which is accessible in moderate purity.

Examples 5-10

Ethylene Homopolymerizations Using Various Catalyst Systems

Examples 5-6 involve solution homopolymerizations of ethylene monomer using polymerization catalyst systems comprising a cobalt activator (the hydrogen cobalt tetrakis (perfluorophosphine) and dimethylanilinium cobalt tetrakis (perfluorophosphine) products from Examples 3 and 4, respectively), a tri-n-octylaluminum (TNOAL) scavenger, and a zirconium compound having the following formula:

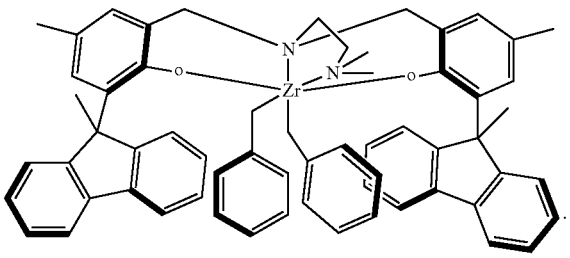

Polymerizations were carried out in a parallel, pressure reactor, as generally described in U.S. Pat. Nos. 6,306,658; 6,455,316; 6,489,168; WO 00/09255; and Murphy et al., J. Am. Chem. Soc., 2003, 125, pp. 4306-4317, each of which is fully incorporated herein by reference. The experiments were conducted in an inert atmosphere (N$_2$) drybox using autoclaves equipped with an external heater for temperature control, glass inserts (internal volume of reactor=23.5 mL for C2 and C2/C8; 22.5 mL for C3 runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours. Although the specific quantities, temperatures, solvents, reactants, reactant ratios, pressures, may vary, the following describes a typical polymerization performed in a parallel, pressure reactor.

In a typical procedure, a pre-weighed glass vial insert and disposable stirring paddle were fitted to each reaction vessel of the reactor, which contains 48 individual reaction vessels. The reactor was then closed and purged with ethylene. Each vessel was charged with enough solvent (typically isohexane) to bring the total reaction volume, including the subsequent additions, to the desired volume, typically 5 mL. A comonomer, if required, was injected into the reaction vessel and the reactor was heated to the set temperature and pressurized to the predetermined pressure of ethylene, while stirring at 800 rpm. The aluminum compound in toluene was then injected typically as scavenger followed by addition of the catalyst followed by the activator solution (typically 1.0-1.2 molar equivalents).

The catalyst solution (typically 0.020-0.080 umol of metal complex) was injected into the reaction vessel and the polymerization was allowed to proceed until a pre-determined amount of ethylene (quench value typically 20 psi) had been used up by the reaction. Alternatively, the reaction may be allowed to proceed for a set amount of time (maximum reaction time typically 30 to 60 minutes). Ethylene was added continuously (through the use of computer controlled solenoid valves) to the autoclaves during polymerization to maintain reactor gauge pressure (+/−2 psig) and the reactor temperature was monitored and typically maintained within +/−1° C. The reaction was quenched by pressurizing the vessel with compressed air. After the reactor was vented and cooled, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight.

Equivalence was determined based on the mole equivalents relative to the moles of the transition metal in the catalyst complex.

Table 1 below shows various characteristics of the polymerizations of Examples 5-6, as well as of Comparative Examples 1-4, and of the polymer products resulting therefrom (as applicable). In Comparative Example 1, the polymerization catalyst system contained the zirconium compound above, the TNOAL scavenger, and a known borate non-coordinating anion activator (N,N-dimethylanilinium tetrakis(perfluorophenyl)borate). Comparative Example 2 shows the deleterious effects on polymerization of using the zirconium catalyst and the scavenger without any activator. Comparative Examples 3-4 show the effects on polymerization of using the zirconium catalyst and the inventive activators (from Examples 3 and 4, respectively) but without any scavenger (to counteract the diethyl ether impurities, inter alia), analogous to Examples 5-6.

light scattering detector. The molecular weights presented are relative to linear polystyrene standards and are uncorrected, unless indicated otherwise.

The activators in the catalyst systems of Examples 5-6 show unique molecular weight performance relative to the conventional borate activator in Comparative Example 1. Though the activators in the catalyst systems of Examples 5-6 may show a 2- to 3-orders of magnitude decrease in polymerization activity, as compared with the more conventional borate activator of Comparative Example 1, it is believed that the diethyl ether impurities may disproportionately affect the metallocene-metallate complex more than the metallocene-borate complex. Indeed, the particular zirconium catalyst compound was chosen in the Examples and Comparative Examples herein for its reduced sensitivity to diethyl ether impurities, compared to other polymerization catalysts. Without being bound by theory, it is believed that cobalt perfluorinated-ligand activators specifically made

TABLE I

| Example | Activator | Scavenger | Yield (mg) | Rxn time (sec) | Activity (g/mmol-hr) | Mw | Mn | Mw/Mn |
|---|---|---|---|---|---|---|---|---|
| 5 | HCo(PF3)4 | TNOAL | 29 | 2965 | 570 | 2350 | 810 | 2.9 |
| 6 | [DMAH][Co(PF3)4] | TNOAL | 30 | 1748 | 1020 | 3370 | 1250 | 2.7 |
| Comp 1 | [DMAH][B(C6F5)4] | TNOAL | 180 | 24 | $4.50 \times 10^5$ | 3160 | 790 | 4.0 |
| Comp 2 | None | TNOAL | 8.1 | 3600 | 135 | N/A* | N/A* | N/A* |
| Comp 3 | HCo(PF3)4 | None | 0 | 3600 | N/A | N/A | N/A | N/A |
| Comp 4 | [DMAH][Co(PF3)4] | None | 0 | 3600 | N/A | N/A | N/A | N/A |

*though polymer product was formed, not enough was isolatable for analysis.

Each polymerization was conducted using a parallel polymerization reactor as described above. In a typical experiment an automated syringe was used to introduce into the reactor the following reagents, if utilized, in the following order: isohexane (0.35 mL), an isohexane solution of TNOAL scavenger (200 μL, 5 mM), additional isohexane (0.35 mL), a toluene solution of the respective polymerization catalyst (150 μL, 0.4 mM), additional isohexane (0.35 mL), a toluene solution of the respective activator (150 μL, 0.4 mM), then additional isohexane so that the total solvent volume for each run was 5 mL. Each reaction was performed at about 90° C. while applying about 200 psig of ethylene (monomer) gas. Each reaction was allowed to run for about 1 hour (~3600 seconds) or until approximately 20 psig of ethylene gas uptake was observed, at which point the reactions were quenched with air (~300 psig). When sufficient polymer yield was attained (e.g., at least ~10 mg), the polyethylene product was analyzed by GPC using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm×7.5 mm linear columns, each containing PLgel 10 μm, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.28 mg/mL and 400 uL of a polymer solution was injected into the system. The concentration of the polymer in the eluent was monitored using an evaporative without diethyl ether impurities, such as using the disclosed high-pressure synthesis method (and activators generally synthesized without other catalyst-poisoning impurities), would show higher polymerization catalyst system activities with this particular zirconium catalyst compound and would also have acceptable (if not superior) polymerization catalyst system activities with other metallocenes and/or other catalyst compounds, thus leading to useful polymerization methods that can yield useful polymerization products.

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is not incorporated by reference herein. As should be apparent from the foregoing general description and the specific embodiments, while forms of the invention have been illustrated and described, various modifications can be made without departing from the spirit and scope of the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Accordingly, it is not intended that the invention be limited thereby. Likewise, the term "comprising" is considered synonymous with the term "including." Also, whenever a composition, an element, or a group of elements is preceded with the transitional phrase "comprising," it should be understood that the same composition or group of elements is contemplated with transitional phrases "consisting essentially of," "consisting of," "selected from the group of consisting of," or "is" preceding the recitation of the composition, element, or elements, and vice versa.

What is claimed is:

1. A polymerization catalyst system comprising activator, a polymerization catalyst compound, and optionally a scavenger, wherein the activator is represented by the formula:

$$[H(R^1)(R^2)(R^3)N^+][(L)_mM^-]$$

wherein: M is a group 8 or 9 metal having a coordination number of 2, 3 or 4; m is 1, 2 or 3; each L ligand is independently an organic or inorganic perhalogenated group, or optionally two or more L ligands optionally together form a ligand complex; and each $R^1$, $R^2$, and $R^3$ is independently a substituted or unsubstituted linear, branched linear, or cyclic C1-C30 hydrocarbyl group, or two or more of $R^1$, $R^2$, and $R^3$, taken together, collectively form one or more substituted or unsubstituted heterocyclic rings containing the nitrogen atom.

2. The polymerization catalyst system of claim 1, wherein each $R^1$, $R^2$, and $R^3$ is independently a substituted or unsubstituted linear, branched linear, or cyclic C1-C8 hydrocarbyl group.

3. The polymerization catalyst system of claim 1, wherein the polymerization catalyst compound comprises a pyridylamine catalyst, a pyridyl-diimine catalyst, a diamidoamine catalyst, a phosphinimine catalyst, a diimine catalyst, a diamide catalyst, a pyrrolidineimine catalyst, a phenoxydiamine catalyst, a diphenoxy amine catalyst, diphenoxy diamine catalyst, a catalyst with two phenoxy groups bridged by a moiety with two coordinating atoms, a phenoxyimine catalyst, a bisphenylphenol catalyst, a bridged metallocene catalyst, an unbridged metallocene catalyst, or a combination thereof.

4. The polymerization catalyst system of claim 3, wherein the polymerization catalyst compound comprises a zirconium diphenoxyamine catalyst.

5. The polymerization catalyst system of claim 1, wherein the scavenger is present and comprises diethyl zinc, methylalumoxane, trimethylaluminum, triethylaluminum, triisobutylaluminum, trihexylaluminum, trioctylaluminum, or a combination thereof.

6. The polymerization catalyst system of claim 1, wherein:
the activator comprises hydrogen cobalt tetrakis(perfluorophosphine), dimethylanilinium cobalt tetrakis(perfluorophosphine), hydrogen cobalt tetrakis(tri(perfluorophenyl)phosphine), dimethylanilinium cobalt tetrakis(tri(perfluorophenyl)phosphine), or a combination thereof;
the scavenger is present and comprises a C1-C18 trialkylaluminum compound; and
the polymerization catalyst compound comprises a zirconium metallocene compound, a hafnium metallocene compound, a titanium metallocene compound, or a combination thereof.

7. The polymerization catalyst system of claim 6, wherein M comprises iron, cobalt, ruthenium, rhodium, osmium, iridium, or a combination thereof.

8. The polymerization catalyst system of claim 6, wherein M is cobalt.

9. The polymerization catalyst system of claim 6, wherein the catalyst system is a result of the combination of the activator, polymerization catalyst compound, and optionally scavenger.

* * * * *